(12) United States Patent
Toriyama et al.

(10) Patent No.: US 11,735,798 B2
(45) Date of Patent: Aug. 22, 2023

(54) BUS BAR MODULE

(71) Applicant: Yazaki Corporation, Tokyo (JP)

(72) Inventors: Atsuya Toriyama, Shizuoka (JP); Tatsuya Tokuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 388 days.

(21) Appl. No.: 17/129,910

(22) Filed: Dec. 22, 2020

(65) Prior Publication Data

US 2021/0203042 A1 Jul. 1, 2021

(30) Foreign Application Priority Data

Dec. 26, 2019 (JP) .................................. 2019-235841

(51) Int. Cl.
*H01M 10/00* (2006.01)
*H01M 50/507* (2021.01)
*H01M 50/569* (2021.01)
*H01M 10/48* (2006.01)

(52) U.S. Cl.
CPC ....... *H01M 50/507* (2021.01); *H01M 10/482* (2013.01); *H01M 10/486* (2013.01); *H01M 50/569* (2021.01)

(58) Field of Classification Search
CPC ............. H01M 50/507; H01M 10/482; H01M 10/486; H01M 50/569; H01M 50/209; Y02E 60/10
See application file for complete search history.

(56) References Cited

U.S. PATENT DOCUMENTS

| 2017/0328783 A1 | 11/2017 | Okamoto et al. |
| 2018/0342717 A1 | 11/2018 | Shoji et al. |
| 2021/0210822 A1 * | 7/2021 | Yanagida ............ H01M 50/507 |

FOREIGN PATENT DOCUMENTS

| EP | 3136470 A1 | 3/2017 |
| JP | 2013-162569 A | 8/2013 |
| JP | 2018-200790 A | 12/2018 |
| JP | 2019-212421 A | 12/2019 |
| WO | WO-2019230542 A1 * | 5/2019 ............ H01G 11/10 |
| WO | 2019/230542 A1 | 12/2019 |

* cited by examiner

*Primary Examiner* — Nicholas P D'Aniello
(74) *Attorney, Agent, or Firm* — Kenealy Vaidya LLP

(57) ABSTRACT

A bus bar module includes bus bars electrically connected with battery cells included in a battery module, and an insulating case including a housing unit that accommodates the bus bars and a routing path in which a voltage detection line connected with the bus bars is routed. The bus bars include a first bus bar group arrayed in a direction in which the battery cells are arranged, and a second bus bar group parallel to the first bus bar group and arrayed in the direction in which the battery cells are arranged. The routing path includes a first routing path extending along the first bus bar group, a second routing path extending along the second bus bar group, and at least one connection path connecting the first routing path and the second routing path.

8 Claims, 19 Drawing Sheets

BUS BAR MODULE

CROSS-REFERENCE TO RELATED APPLICATION(S)

The present application claims priority to and incorporates by reference the entire contents of Japanese Patent Application No. 2019-235841 filed in Japan on Dec. 26, 2019.

BACKGROUND OF THE INVENTION

1. Field of the Invention

The present invention relates to a bus bar module.

2. Description of the Related Art

Bus bar modules have been conventionally available. Japanese Patent Application Laid-open No. 2018-200790 discloses a bus bar module including a plurality of bus bars electrically connecting single batteries with one another, a plurality of electrical lines electrically connected with the bus bars, and an electrical line routing body in which the electrical lines are housed.

It is desirable that, in a bus bar module, the flexibility of a routing route on which an electrical Line is routed can be improved. For example, the flexibility of a routing route is high when it is possible to select an optimum routing route in accordance with a purpose.

SUMMARY OF THE INVENTION

The present invention is intended to provide a bus bar module in which the flexibility of a routing route can be improved.

In order to achieve the above mentioned object, a bus bar module according to one aspect of the present invention includes a plurality of bus bars electrically connected with a plurality of battery cells included in a battery module; and an insulating case including a housing unit configured to accommodate the bus bars and a routing path in which a voltage detection line connected with the bus bar is routed, wherein the bus bars include a first bus bar group arrayed in a direction in which the battery cells are arranged, and a second bus bar group parallel to the first bus bar group and arrayed in the direction in which the battery cells are arranged, and the routing path includes a first routing path extending along the first bus bar group in the direction in which the battery cells are arranged, a second routing path extending along the second bus bar group in the direction in which the battery cells are arranged, and at least one connection path connecting the first routing path and the second routing path.

According to another aspect of the present invention, in the bus bar module, it is preferable that the connection path extends in a direction orthogonal to the direction in which the battery cells are arranged.

According to still another aspect of the present invention, in the bus bar module, it is preferable that the first routing path is partitioned into a plurality of partial routing paths arranged in the direction in which the battery cells are arranged, and each of the partial routing paths of the first routing path is connected with the second routing path through the connection path.

According to still another aspect of the present invention, in the bus bar module, it is preferable that the second routing path is partitioned into a plurality of partial routing paths arranged in the direction in which the battery cells are arranged, and each of the partial routing paths of the second routing path is connected with the first routing path through the connection path.

According to still another aspect of the present invention, it is preferable that the bus bar module further includes a thermistor configured to detect temperature of the battery cell, wherein the thermistor is held at a first end part as one end part of the partial routing path, and the connection path is connected with the partial routing path at a position different from the first end part.

According to still another aspect of the present invention, in the bus bar module, it is preferable that the connection path is connected with a second end part as an end part of the partial routing path opposite to the first end part.

According to still another aspect of the present invention, in the bus bar module, it is preferable that the first end part is provided with a partition wall that partitions the thermistor from another adjacent partial routing path.

According to still another aspect of the present invention, it is preferable that the bus bar module further includes a thermistor configured to detect temperature of the battery cell, wherein the voltage detection line is routed bypassing the thermistor through the connection path to avoid overlapping the thermistor.

According to still another aspect of the present invention, in the bus bar module, it is preferable that the routing path includes a bottom wall facing the battery cells, a first side wall erected from one end of the bottom wall in a width direction, and a second side wall erected from the other end of the bottom wall in the width direction, the connection path is provided with an electrical line presser including a first pressing part and a second pressing part, the first pressing part protruding from the first side wall toward the second side wall, the second pressing part protruding from the second side wall toward the first side wall and facing the first pressing part, the first pressing part is tilted so that the first pressing part is closer to the bottom wall toward a leading end of the first pressing part, and the second pressing part is tilted so that the second pressing part is closer to the bottom wall toward a leading end of the second pressing part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A bus bar module according to an embodiment of the present invention will be described below in detail with reference to the accompanying drawings. The present invention is not limited by the present embodiment. Components in the following embodiment include those that would be easily thought of by the skilled person in the art and those identical in effect.

Embodiment

Figure 1:
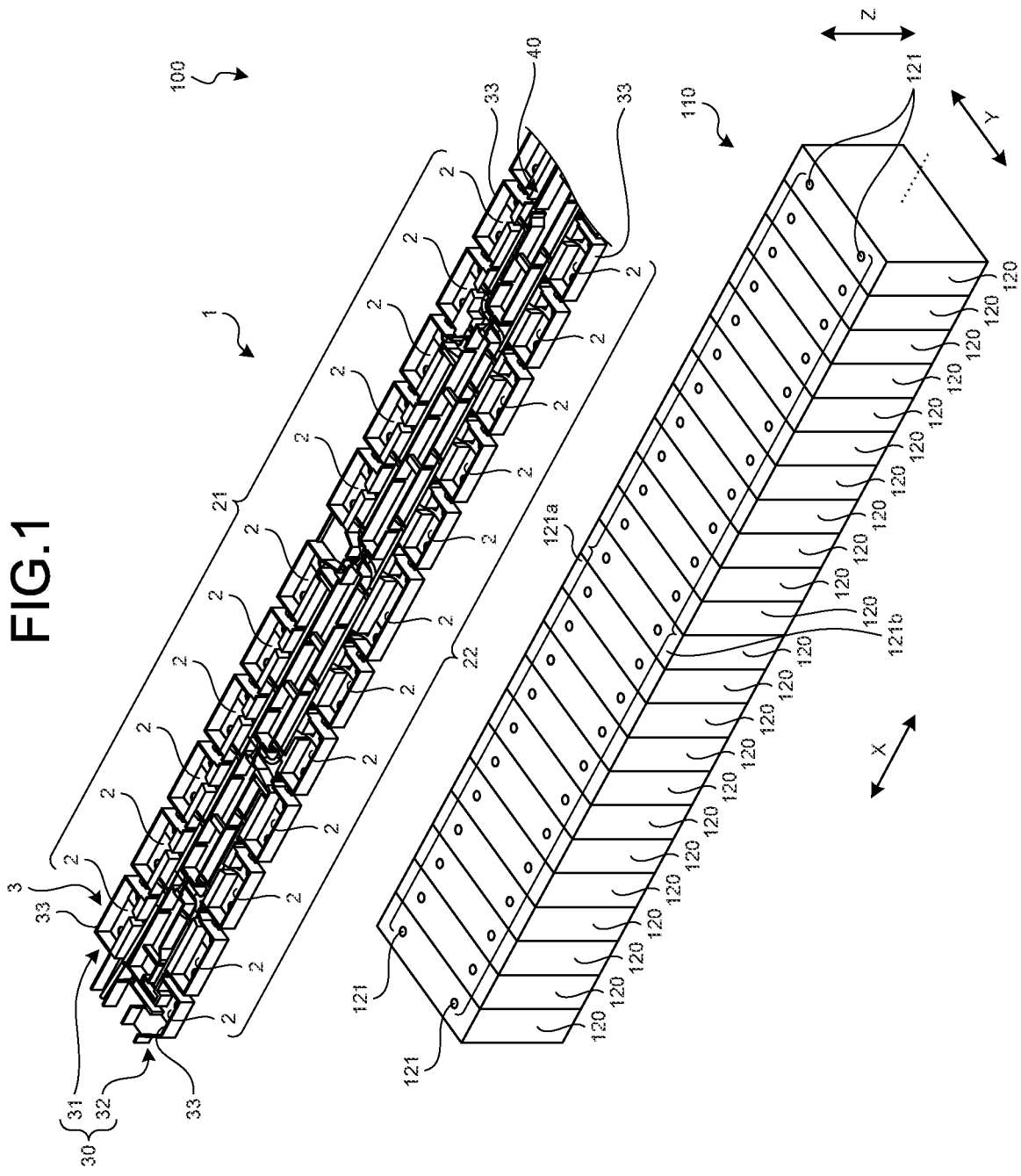
FIG. 1 is a perspective view illustrating a battery pack according to an embodiment.
Figure 2:
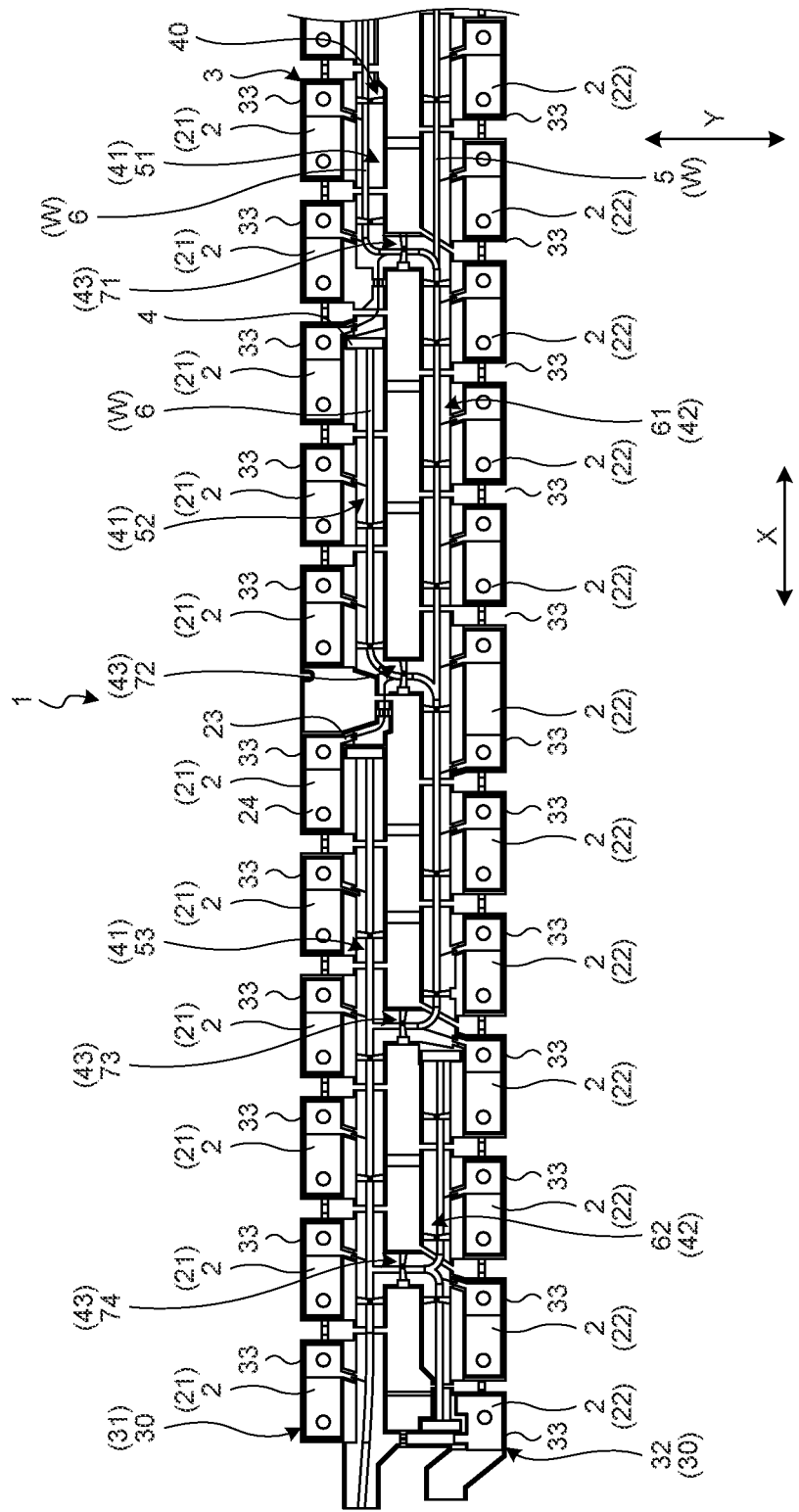
FIG. 2 is a plan view of a bus bar module according to the embodiment.
Figure 3:
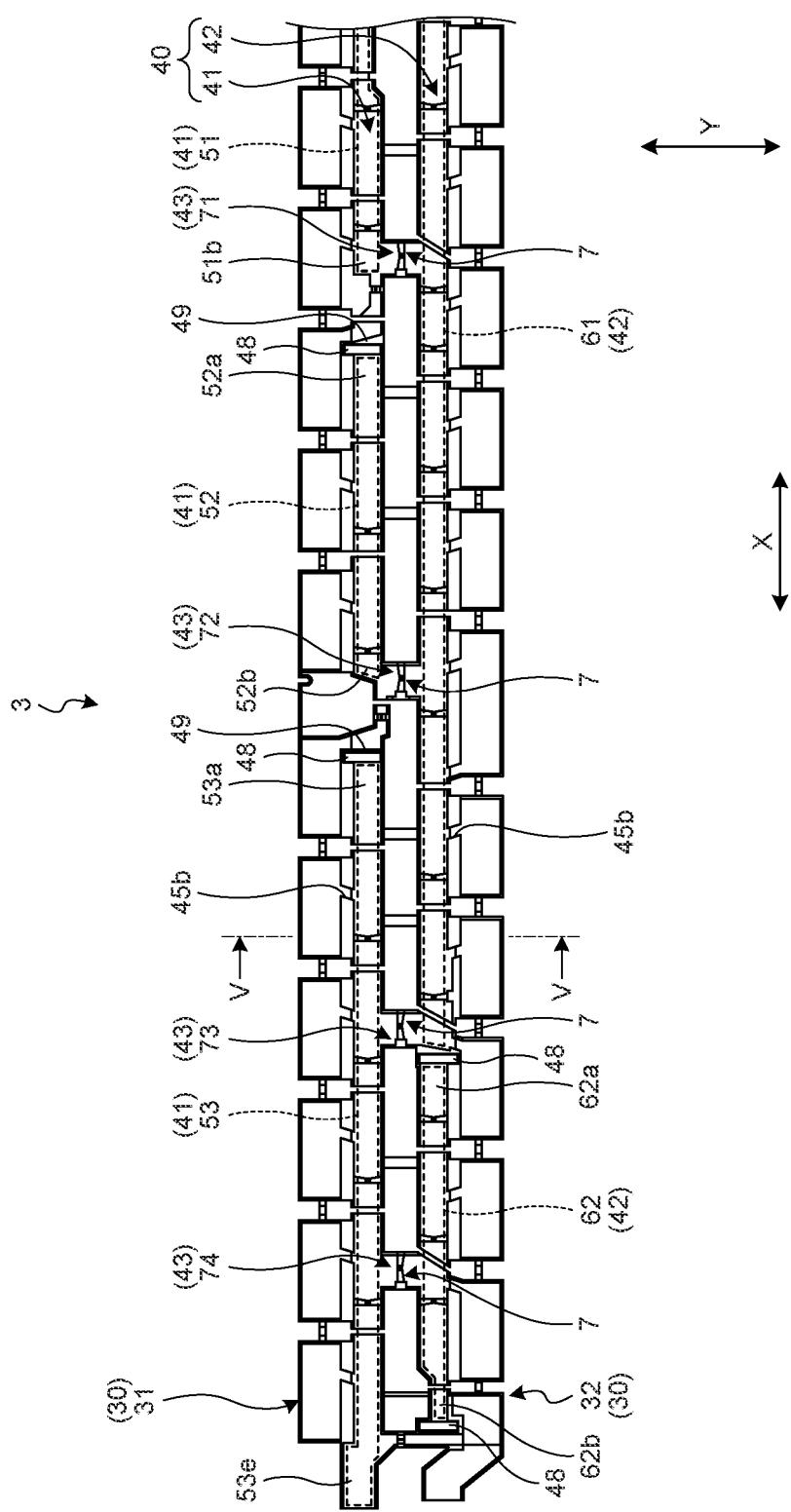
FIG. 3 is a plan view of a case according to the embodiment.
Figure 4:
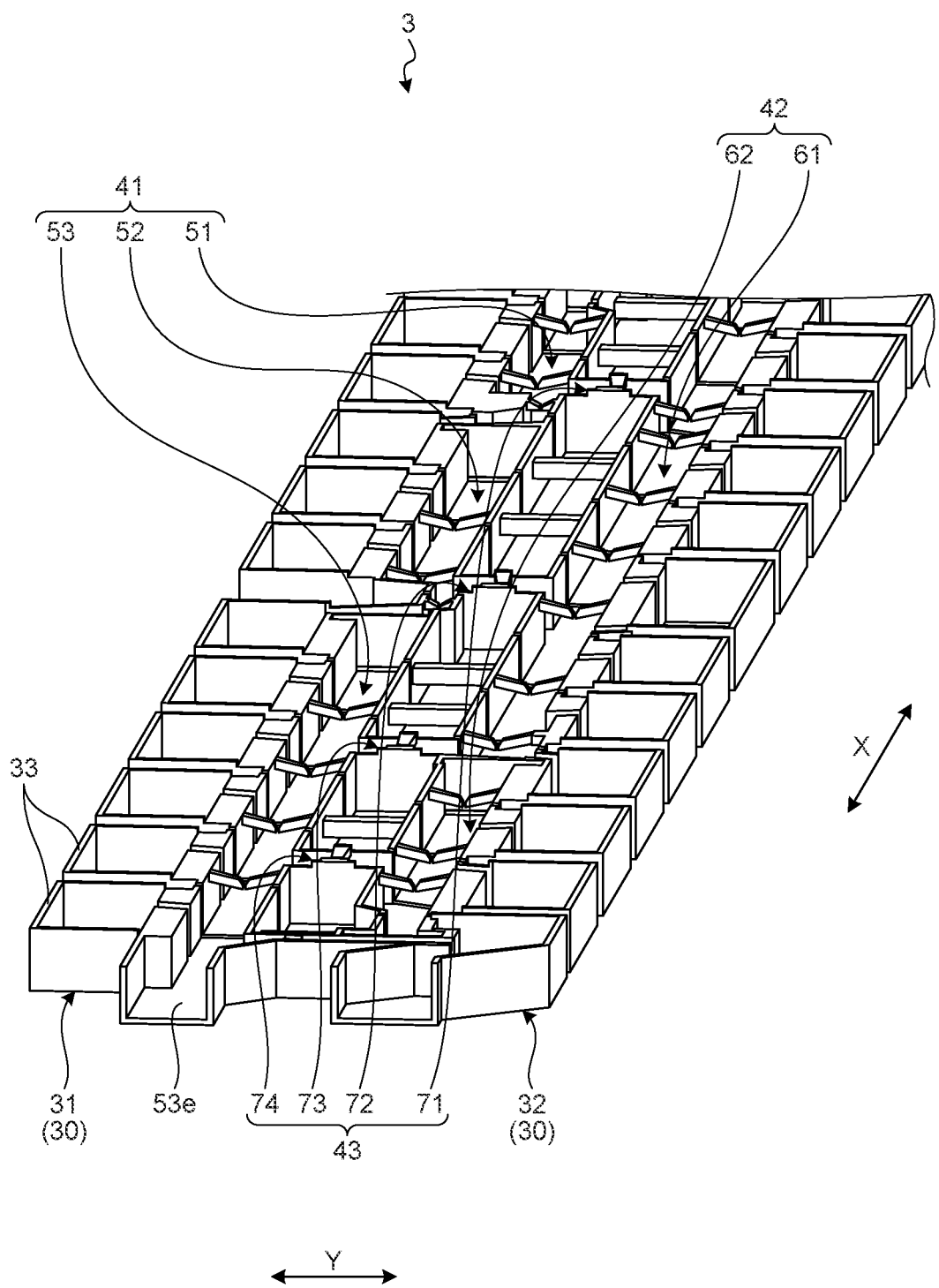
FIG. 4 is a perspective view of the case according to the embodiment.
Figure 5:
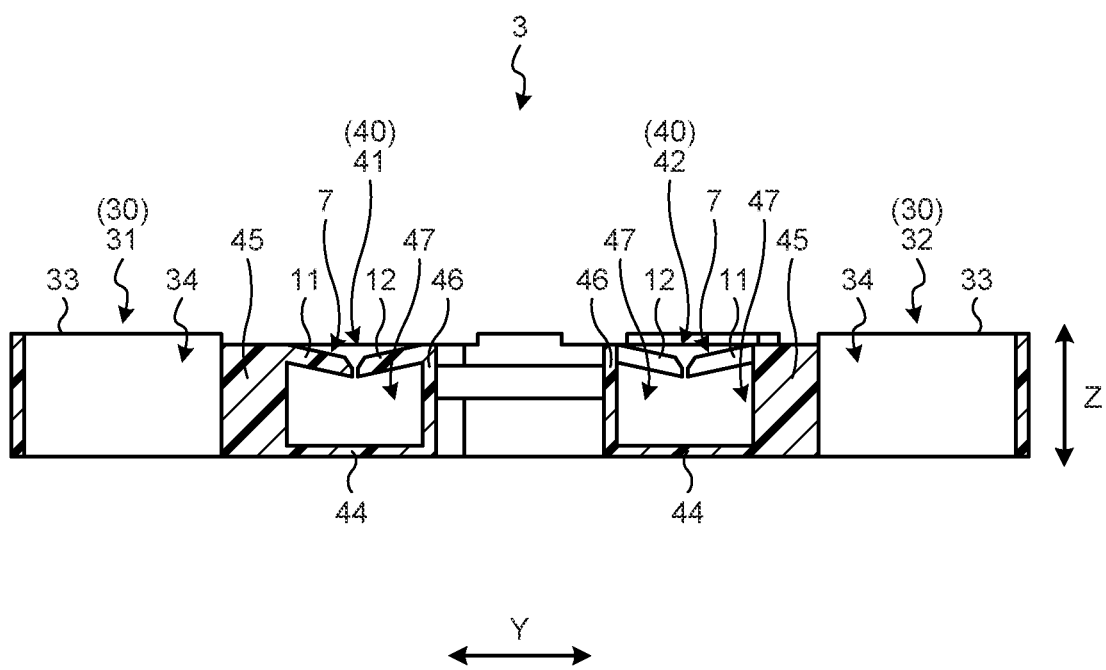
FIG. 5 is a cross-sectional view of the case according to the embodiment.
Figure 6:
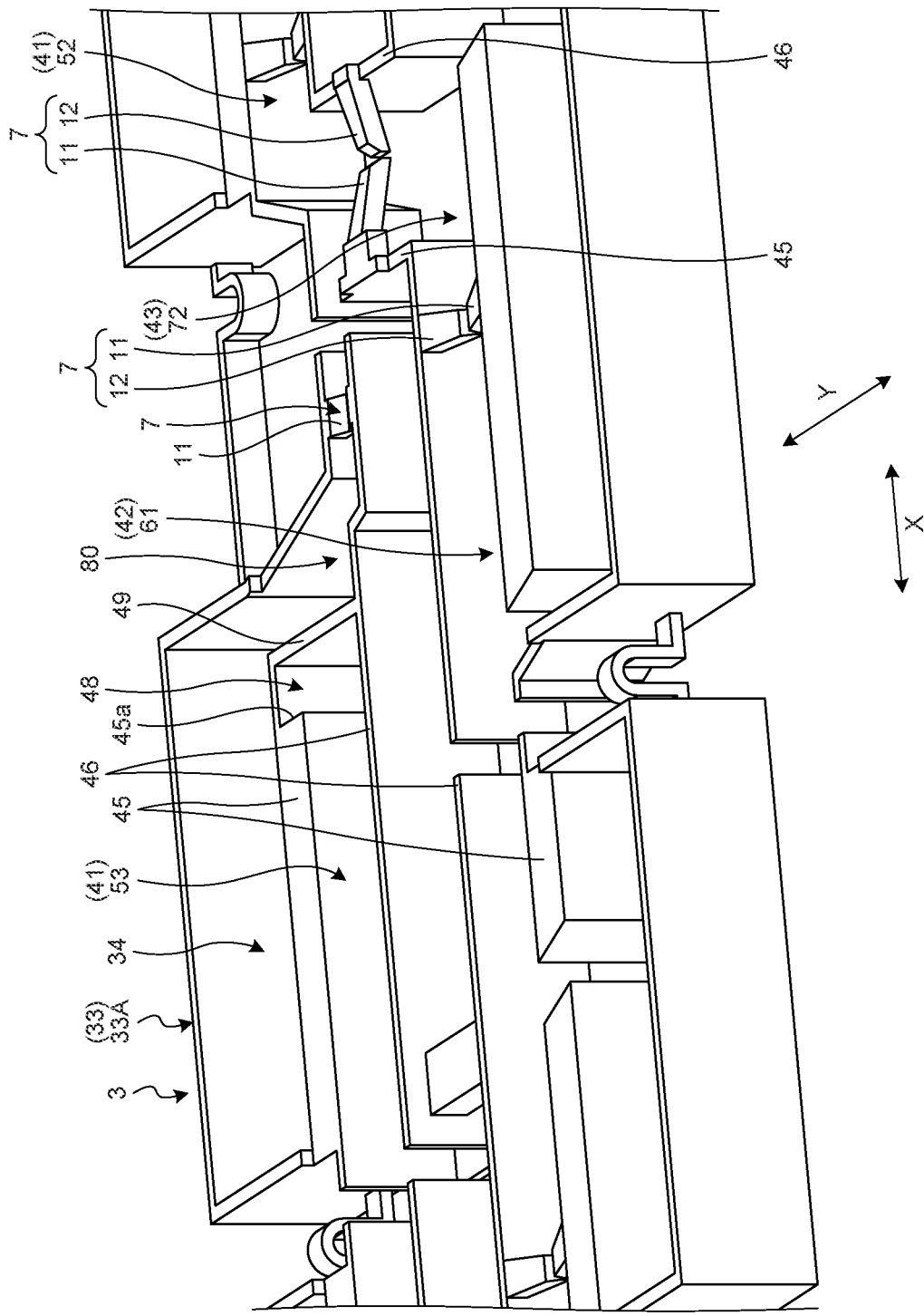
FIG. 6 is a perspective view of the case according to the embodiment.
Figure 7:
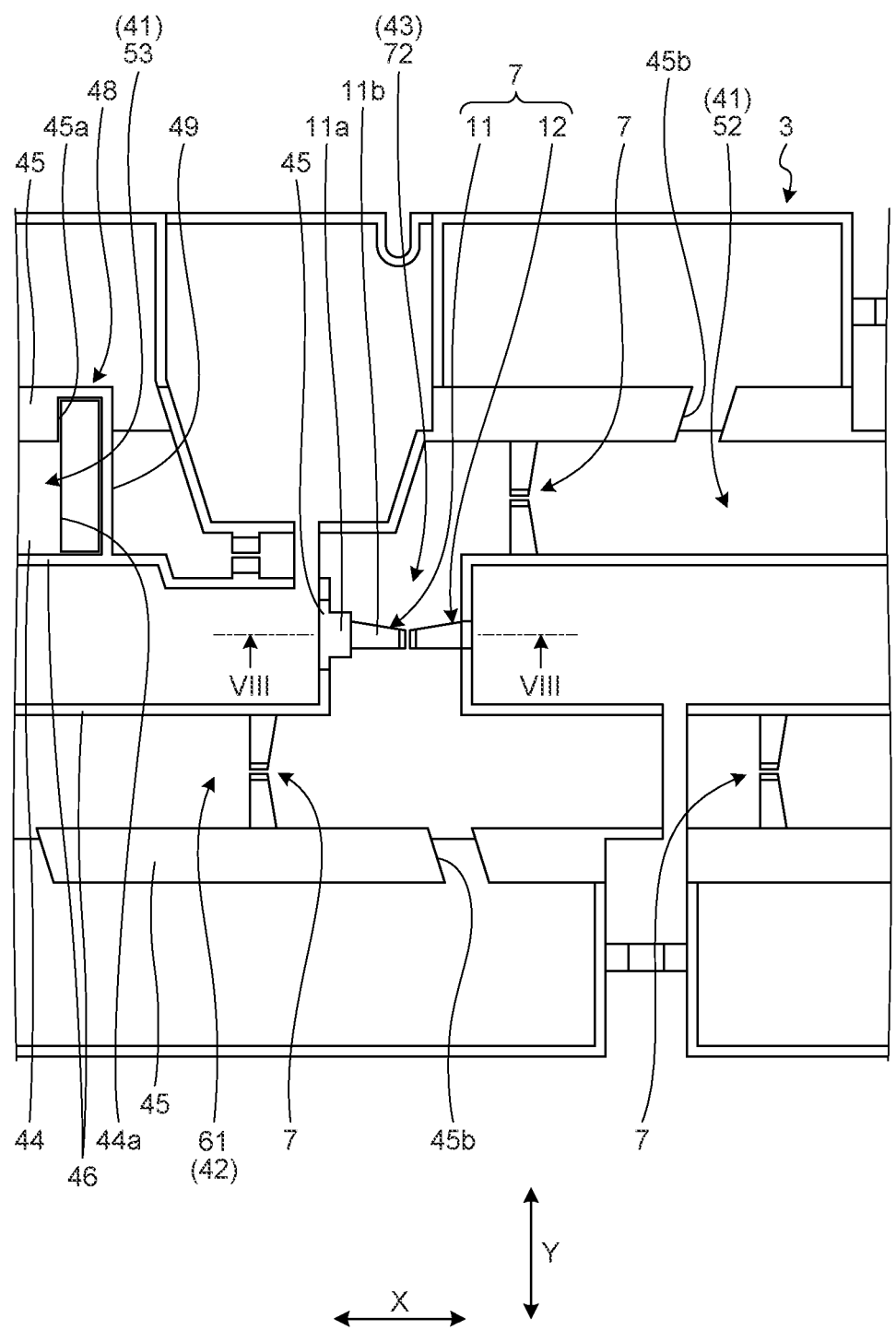
FIG. 7 is a plan view illustrating an electrical line presser provided in a connection path.
Figure 8:
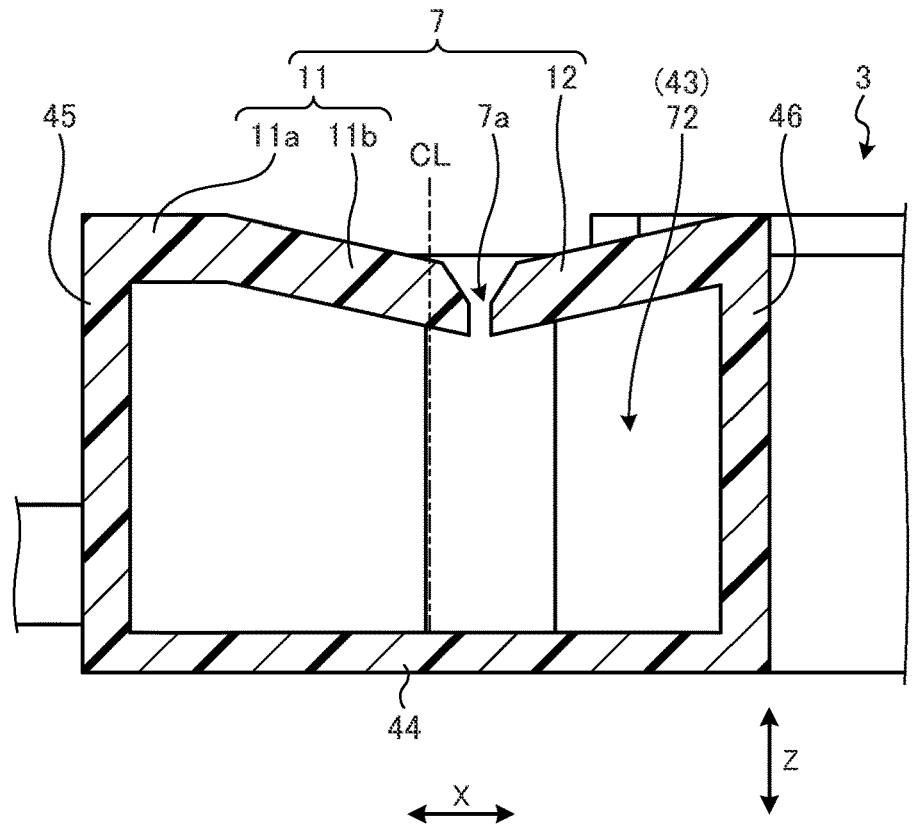
FIG. 8 is a cross-sectional view of the electrical line presser provided in the connection path.
Figure 9:
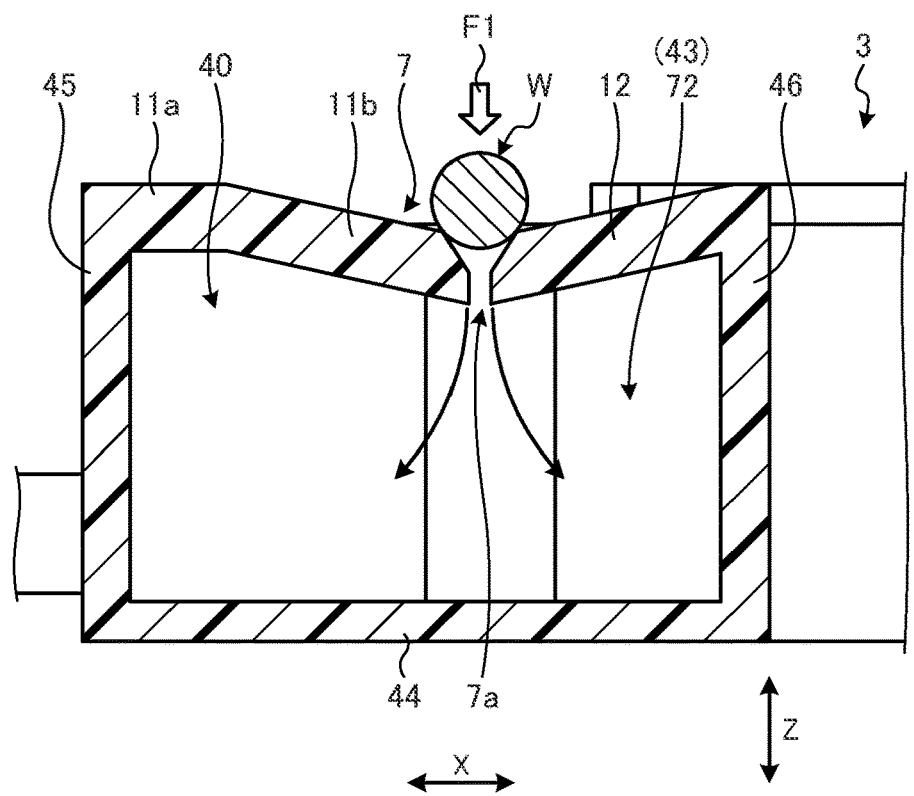
FIG. 9 is a cross-sectional view of the electrical line presser provided in the connection path.

The following describes the embodiment with reference to FIGS. 1 to 20. The present embodiment relates to a bus bar module. FIG. 1 is a perspective view illustrating a battery pack according to the embodiment, FIG. 2 is a plan view of a bus bar module according to the embodiment, FIG. 3 is a plan view of a case according to the embodiment, FIG. 4 is a perspective view of the case according to the embodiment, FIG. 5 is a cross-sectional view of the case according to the embodiment, FIG. 6 is a perspective view of the case according to the embodiment, FIG. 7 is a plan view illustrating an electrical line presser provided in a connection path, FIG. 8 is a cross-sectional view of the electrical line presser provided in the connection path, and FIG. 9 is a cross-sectional view of the electrical line presser provided in the connection path.

Figure 10:
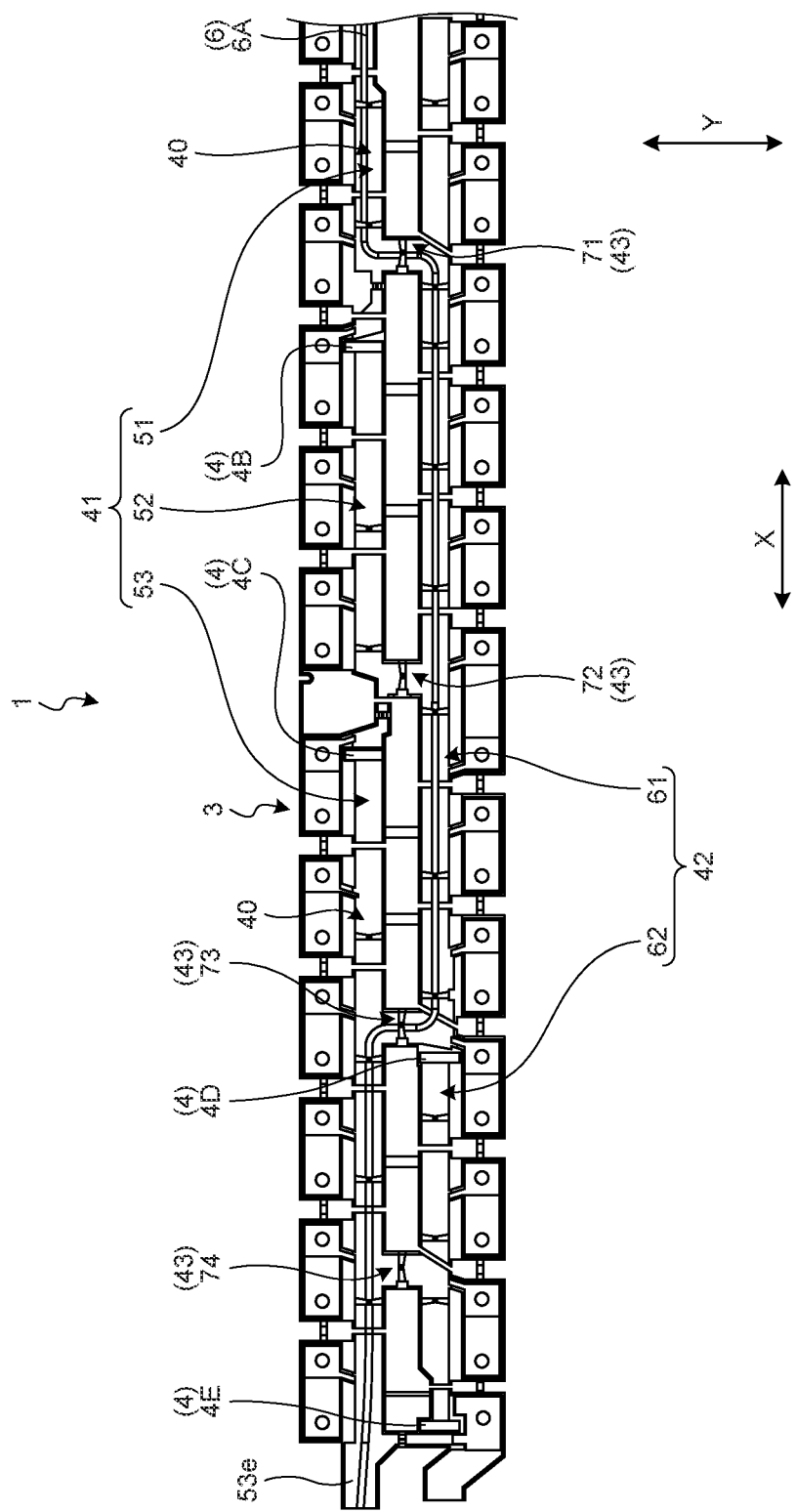
FIG. 10 is a plan view of a routing route of a temperature detection line according to the embodiment.
Figure 11:
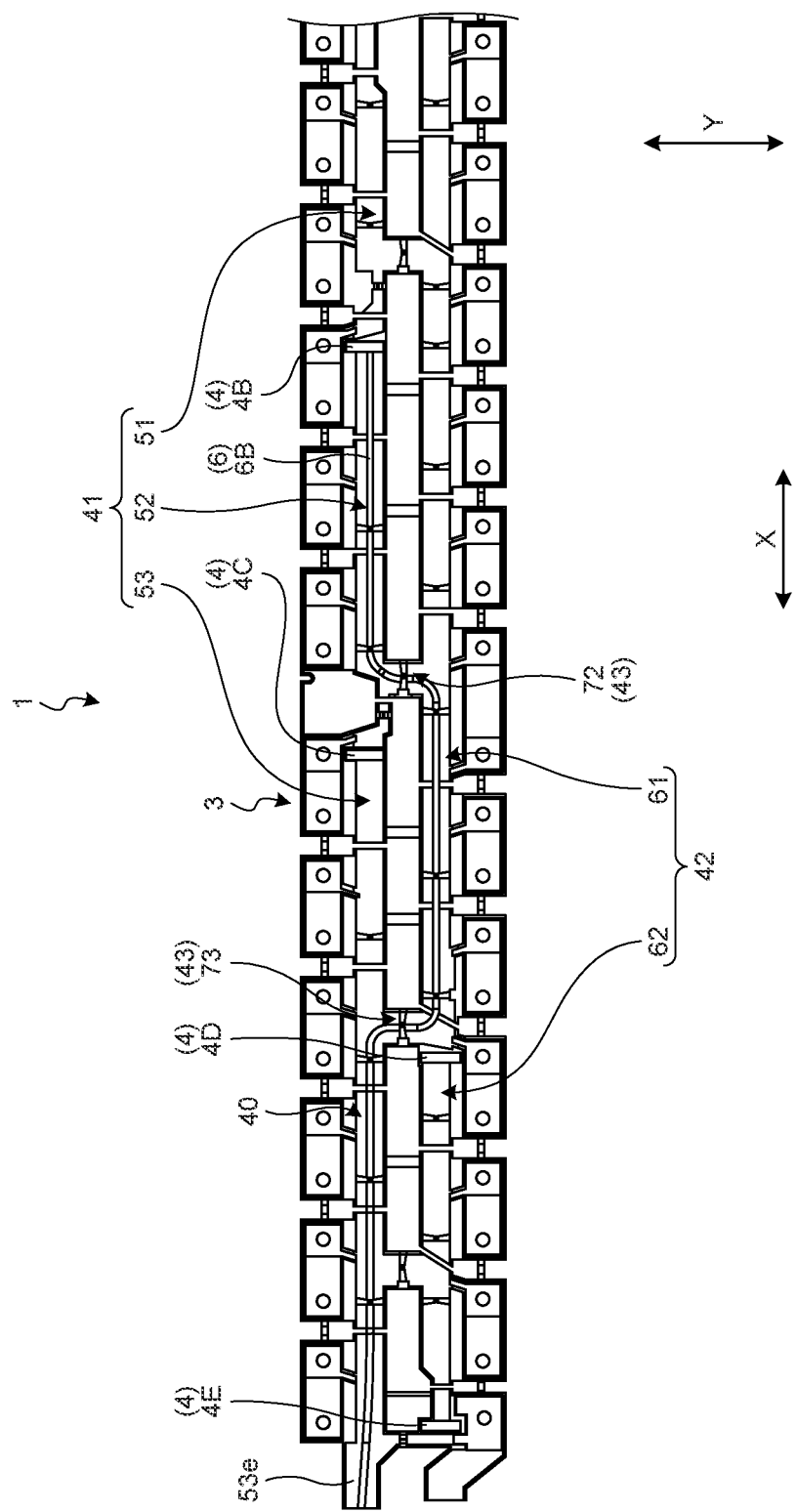
FIG. 11 is a plan view of a routing route of the temperature detection line according to the embodiment.
Figure 12:
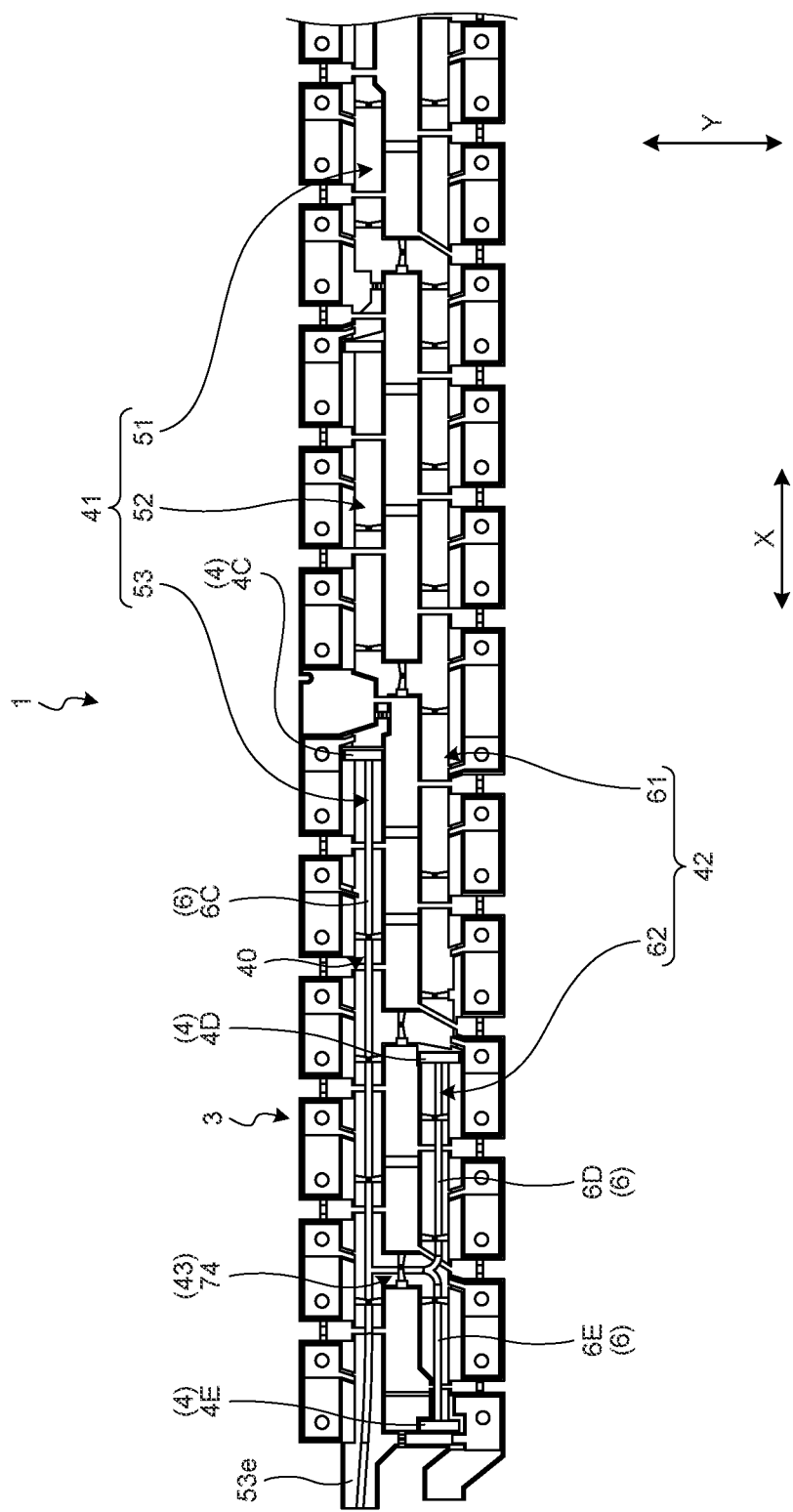
FIG. 12 is a plan view of a routing route of the temperature detection line according to the embodiment.
Figure 18:
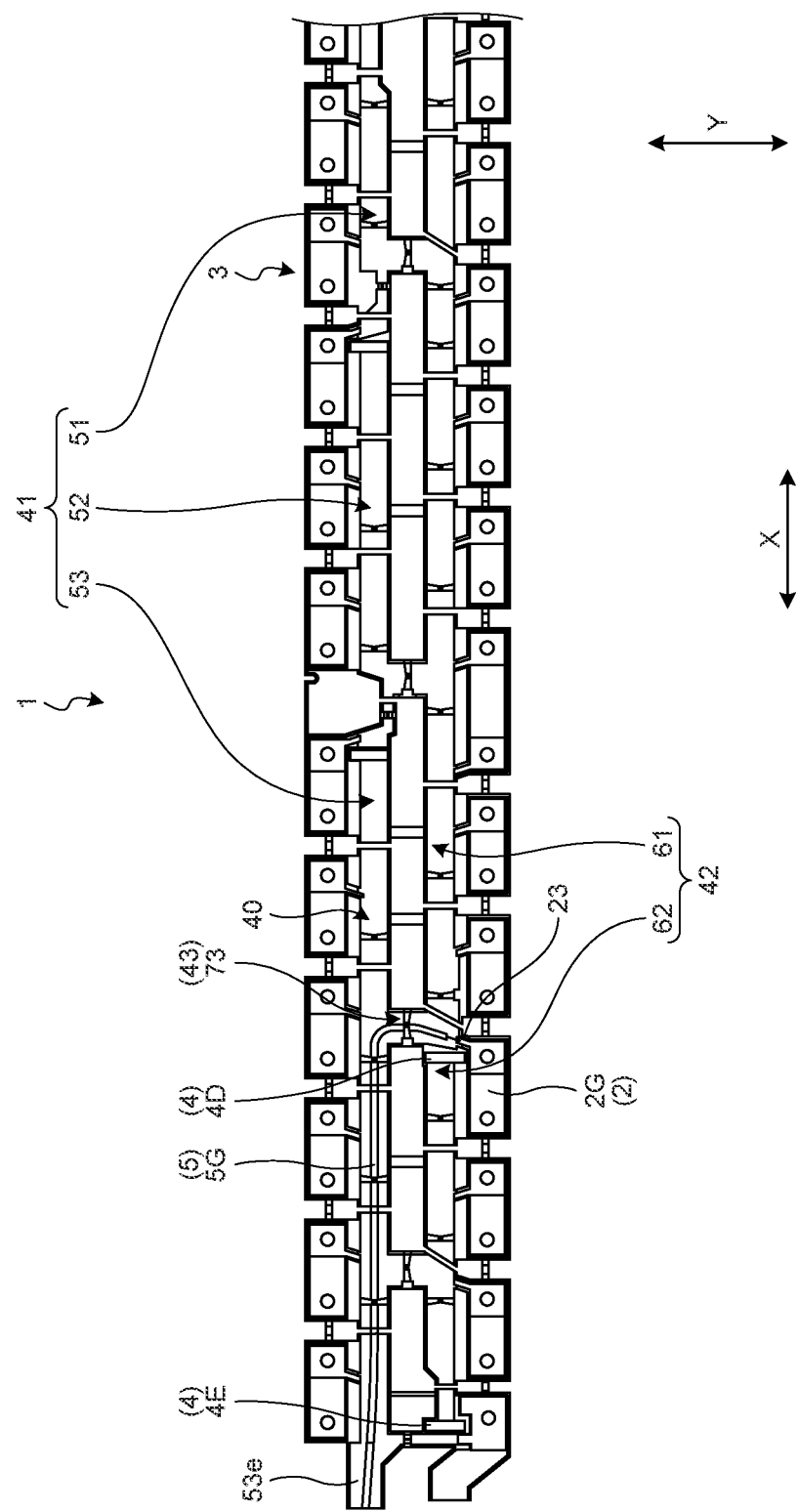
FIG. 18 is a plan view of a routing route of the voltage detection line according to the embodiment.
Figure 19:
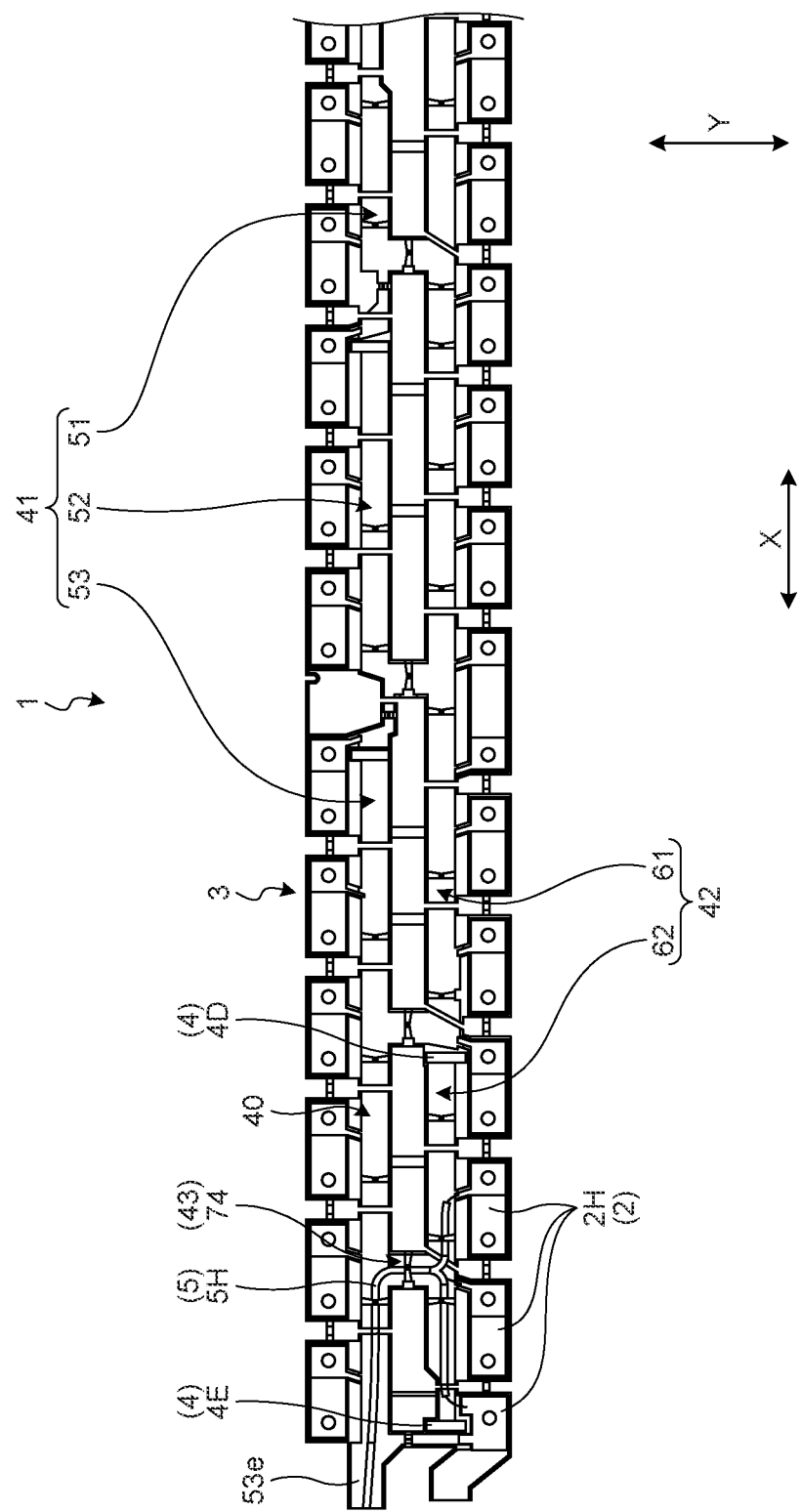
FIG. 19 is a plan view of a routing route of the voltage detection line according to the embodiment.
Figure 20:
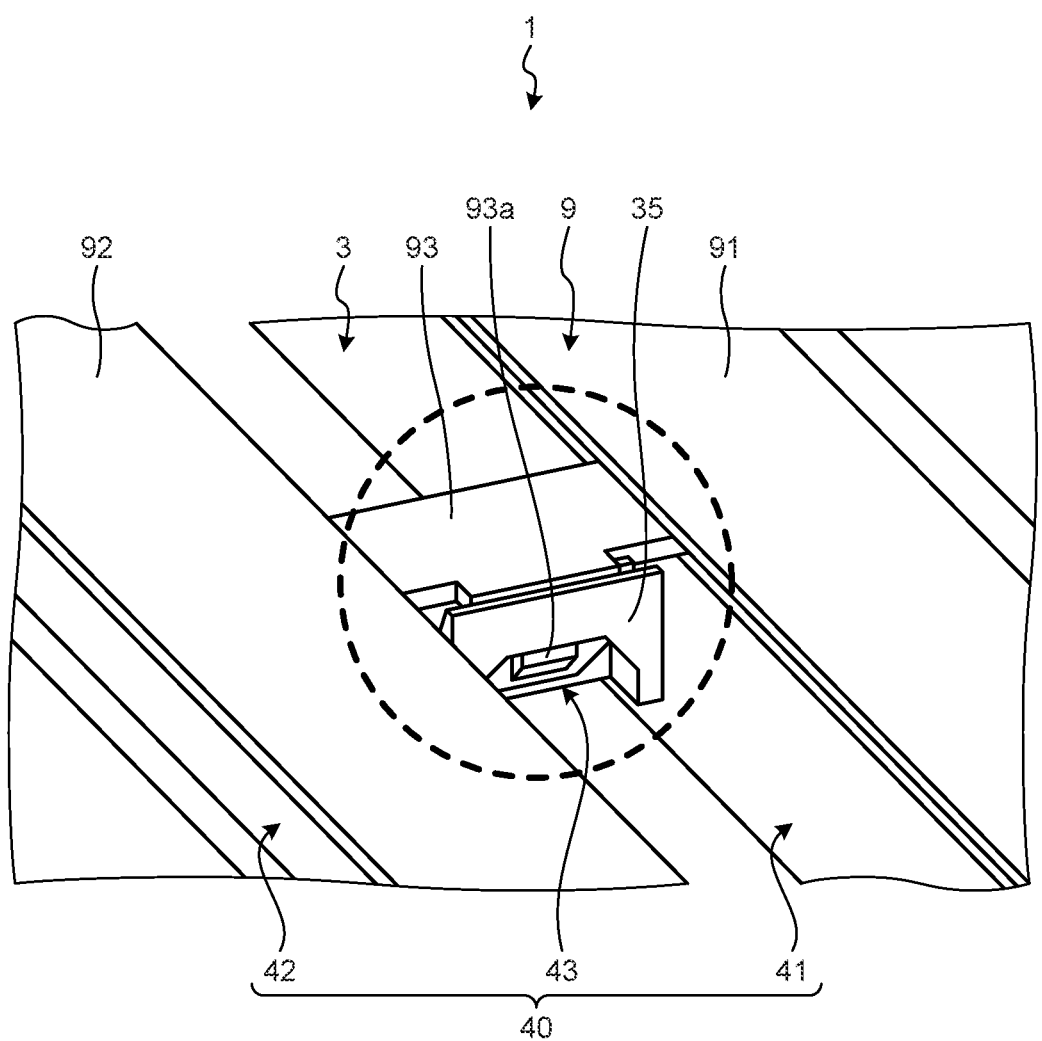
FIG. 20 is a perspective view illustrating a cover according to the embodiment.

FIGS. 10 to 12 are each a plan view of a routing route of a temperature detection line according to the embodiment, FIGS. 13 to 19 are each a plan view of a routing route of a voltage detection line according to the embodiment, and FIG. 20 is a perspective view illustrating a cover according to the embodiment. FIG. 5 illustrates a section along line V-V in FIG. 3. FIG. 8 illustrates a section along line VIII-VIII in FIG. 7.

As illustrated in FIG. 1, a battery pack 100 of the present embodiment includes a bus bar module 1 and a battery module 110. The battery pack 100 is mounted as a power source on a vehicle such as an electric vehicle (FAT), a hybrid electric vehicle (HEV), or a plug-in hybrid electric vehicle (PHEV). The battery pack 100 may include a plurality of bus bar modules 1 and a plurality of battery modules 110.

The battery module 110 includes a plurality of battery cells 120. The shape of each battery cell 120 of the present embodiment is a rectangular parallelepiped shape. Two electrodes 121 are disposed at a first surface 120a of the battery cell 120. The shape of the first surface 120a is substantially a rectangle.

The battery cells 120 are arrayed in a first direction X. More specifically, the battery cells 120 are arrayed so that the long side of each first surface 120a faces the long side of as adjacent first surface 120a in the first direction X. In the following description, a direction in which the battery cells 120 are arranged is referred to as the "first direction X". In addition, a direction orthogonal to the first direction X in the first surface 120a is referred to as a "second direction Y". The second direction Y is the longitudinal direction of the first surface 120a. A direction orthogonal to the first direction X and the second direction Y is referred to as a "third direction Z". The third direction Z is the height direction of the battery cells 120. The first surface 120a is orthogonal to the third direction Z. The battery each 100 is mounted on a vehicle so that, for example, each first surface 120a faces upward is the up-down direction of the vehicle.

The two electrodes 121 of each first surface 120a are arranged is the second direction Y. One of the two electrodes 121 of the first surface 120a is a positive electrode, and the other is a negative electrode. An assembly of electrodes 121 each disposed at one end of the first surface 120a in the longitudinal direction among the two electrodes 121 is referred to as a "first electrode group 121a", and an assembly of electrodes 121 disposed at the other end of the first surface 120a in the longitudinal direction is referred to as a "second electrode group 121b". In the battery module 110 of the present embodiment, positive and negative electrodes are alternately arranged in the first electrode group 121a. Similarly, positive and negative electrodes are alternately arranged in the second electrode group 121b. The bus bar module 1 of the present embodiment connects the battery cells 120 in series.

The bus bar module 1 includes a plurality of bus bars 2, an insulating case 3, a plurality of thermistors 4, and an electrical line W. The electrical line W is, for example, a covered electrical line such as a voltage detection line 5 or a temperature detection line 6. The bus bars 2 are conductive plate members. Each bus bar 2 is formed of a conductive metal plate of, for example, copper or aluminum. The bus bar 2 includes a substantially rectangular body 24, and a terminal part 23 protruding from the body 24. The body 24 of the bus bar 2 is electrically connected with the electrodes 121 of the battery cells 120. The bus bar 2 may be fixed to the electrodes 121 by welding, may be fixed to the electrodes 121 by a fastening member such as a nut, or may be fixed to the electrodes 121 by any other means.

The bus bars 2 include a first bus bar group 21 and a second bus bar group 22. The first bus bar group 21 and the second bus bar group 22 each include a plurality of bus bars 2. The bus bars 2 of the first bus bar group 21 are fixed to the electrodes 121 of the first electrode group 121a. The bus bars 2 of the second bus bar group 22 are fixed to the electrodes 121 of the second electrode group 121b. Each bus bar 2 electrically connects, for example, two adjacent electrodes 121 having polarities different from each other.

The bus bars 2 belonging to the first bus bar group 21 are arrayed in the first direction X. The bus bars 2 belonging to the second bus bar group 22 are arrayed in the first direction X. The second bus bar group 22 is parallel to the first bus bar group 21. The first bus bar group 21 and the second bus bar group 22 may be disposed in parallel to each other. The number of bus bars 2 included in the first bus bar group 21 may be equal to the number of bus bars 2 included in the second bus bar group 22.

The case 3 is molded of, for example, insulating synthesis resin. The shape of the case 3 in plan view is substantially a rectangle. More specifically, the shape of the case 3 is a substantially rectangle having a longitudinal direction in the first direction X. The case 3 includes a housing unit 30 and a routing path 40. The housing unit 30 and the routing path 40 are integrally molded.

The housing unit 30 is a part configured to accommodate the bus bars 2. The housing unit 30 includes a first housing unit 31 and a second housing unit 32. The first housing unit 31 and the second housing unit 32 extend from one end of the case 3 to the other end in the first direction X. The first housing unit 31 and the second housing unit 32 face each other in the second direction Y. The first housing unit 31 accommodates the first bus bar group 21. The second housing unit 32 accommodates the second bus bar group 22. The first housing unit 31 and the second housing unit 32 include a plurality of tubular housing chambers 33. Each bus bar 2 is accommodated and held in the respective housing chamber 33. The housing chambers 33 are arrayed in the first direction X.

The routing path 40 is disposed between the first housing unit 31 and the second housing unit 32. The routing path 40 is a passage in which the various electrical lines W including the voltage detection line 5 and the temperature detection line 6 are routed. The routing path 40 is a recess configured to accommodate the electrical lines and surround the electrical lines from three sides. As illustrated in FIG. 5, the routing path 40 includes a bottom wall 44, a first side wall 45, and a second side wall 46. The bottom wall 44 faces the first surfaces 120a of the battery cells 120. The first side wall 45 is a wall part erected from one end of the bottom wall 44 in the width direction. The second side wall 46 is a wall part erected from the other end of the bottom wall 44 in the width direction. The first side wall 45 and the second side wall 46 face each other. The routing path 40 surrounds and accommodates electrical lines W by the bottom wall 44, the first side wall 45, and the second side wall 46.

As illustrated in FIGS. 2 to 4, the routing path 40 of the present embodiment includes a first routing path 41, a second routing path 42, and a connection path 43. As illustrated in FIG. 2, the first routing path 41 extends along the first bus bar group 21 in the first direction X (direction in which the battery cells 120 are arranged). The second routing path 42 extends along the second bus bar group 22 in the first direction X (direction in which the battery cells 120 are arranged). The connection path 43 connects the first routing path 41 and the second routing path 42.

As illustrated in FIG. 5, the first side wall 45 of the first routing path 41 partitions a housing space 47 for the electrical line W from housing spaces 34 of the corresponding housing chambers 33. The first side wall 45 of the second routing path 42 partitions a housing space 47 for the electrical line W from housing spaces 34 of the corresponding housing chambers 33. Thus, the first side walls 45 are components of the housing chambers 33. A gap is provided between the second side wall 46 of the first routing path 41 and the second side wall 46 of the second routing path 42. As illustrated in FIG. 7 or the like, a cutout 45b is formed at each first side wall 45. The terminal part 23 of each bus bar 2 protrudes to the first routing path 41 or the second routing path 42 through the corresponding cutout 45b.

As illustrated in FIG. 3 or the like, the first routing path 41 is partitioned into a plurality of partial routing paths 51, 52, and 53. The partial routing paths 51, 52, and 53 are arranged in series in the first direction X. The partial routing paths 51, 52, and 53 are arranged in the first direction X in the stated order. The second routing path 42 is partitioned into a plurality of partial routing paths 61 and 62. The partial routing paths 61 and 62 are arranged in series in the first direction X. The entire partial routing paths 51 and 52 and part of the partial routing path 53 face the partial routing path 61 in the second direction Y.

The partial routing paths 52 and 53 of the first routing path 41 include first end parts 52a and 53a and second end parts 52b and 53e, respectively. The first end parts 52a and 53a are end parts at which the thermistors 4 are disposed. The second end parts 52b and 53e are end parts in the partial routing paths 52 and 53, respectively, which are opposite to the first end parts 52a and 53a.

The connection path 43 includes a first connection path 71, a second connection path 72, a third connection path 73, and a fourth connection path 74. The first connection path 71 connects the partial routing path 51 of the first routing path 41 and the partial routing path 61 of the second routing path 42. More specifically, the first connection path 71 connects an end part 51b of the partial routing path 51 and a middle part of the partial routing path 61. The second connection path 72 connects the partial routing path 52 of the first routing path 41 and the partial routing path 61 of the second routing path 42. More specifically, the second connection path 72 connects the second end part 52b of the partial routing path 52 and a middle part of the partial routing path 61.

The third connection path 73 connects the partial routing path 53 of the first routing path 41 and the partial routing path 61 of the second routing path 42. More specifically, the third connection path 73 connects an end part of the partial routing path 61 and a middle part of the partial routing path 53. The fourth connection path 74 connects the partial routing path 53 of the first routing path 41 and the partial routing path 62 of the second routing path 42. More specifically, the fourth connection path 74 connects a middle part of the partial routing path 62 and a middle part of the partial routing path 53.

Accordingly, the partial routing paths 51, 52, and 53 of the first routing path 41 are each connected with the second routing path 42 through at least one connection path 43. In addition, the partial routing paths 61 and 62 of the second routing path 42 are each connected with the first routing path 41 through at least one connection path 43. Thus, with the bus bar module 1 of the present embodiment, it is possible to route an electrical line through various routes in accordance with a purpose. In other words, with the bus bar module 1 of the present embodiment, it is possible to improve the flexibility of setting a routing route of an electrical line.

The routing path 40 includes a holding unit 48 that holds the corresponding thermistor 4. The routing path 40 of the present embodiment is provided with a plurality of holding units 48. The first routing path 41 includes, for example, at least two holding units 48, and the second routing path 42 includes, for example, at least two holding units 48.

The holding unit 48 of the first routing path 41 is disposed in each of the partial routing paths 52 and 53. The holding unit 48 may be disposed in the partial routing path 51 in addition to the partial routing paths 52 and 53. The holding unit 48 in the partial routing path 52 is disposed at the first end part 52a as an end part of the partial routing path 52 in the first direction X. The holding unit 48 in the partial routing path 53 is disposed at the first end part 53a as an end part of the partial routing path 53 in the first direction X.

The first connection path 71 is connected with the end part 51b of the partial routing path 51. The second connection path 72 is connected with the second end part 52b of the partial routing path 52. The third connection path 73 and the fourth connection path 74 are connected with middle parts of the partial routing path 53. In other words, the third connection path 73 and the fourth connection path 74 are connected with the partial routing path 53 at positions different from the position of the first end part 53a in the partial routing path 53.

The holding units 48 of the second routing path 42 is disposed one by one at each end of the partial routing path 62. No holding unit 48 may be provided at the partial routing path 61. The fourth connection path 74 is connected with a middle part of the partial routing path 62. In other words, the fourth connection path 74 is connected with the partial routing path 62 at a position different from each end part of the partial routing path 62.

As illustrated in FIG. 6, the holding unit 48 is constituted by the first side wall 45, the second side wall 46, and a partition wall 49. More specifically, the first side wall 45 is provided with a recess 45a that holds the corresponding thermistor 4. The partition wall 49 connects the first side wall 45 and the second side wall 46 and extends along the second direction Y. The partition wall 49 illustrated in FIG. 6 blocks an end of the partial routing path 53. The partition wall 49 partitions the partial routing path 53 from another adjacent partial routing path 52. In other words, the partition wall 49 partitions the thermistor 4 from another adjacent partial routing path 52. As illustrated in FIG. 7, a through-hole 44a is provided at the bottom wall 44 in the holding unit 48. The thermistor 4 protrudes through the through-hole 44a and contacts the battery cells 120.

The partition wall 49 illustrated in FIG. 6 forms a bypassing path 80 that bypasses the thermistor 4. The bypassing path 80 is connected with one housing chamber 33A. The housing chamber 33A faces the holding unit 48 in the second direction Y. In other words, the housing chamber 33A faces the thermistor 4 held by the holding unit 48. The bypassing path 80 is connected with the second connection path 72, bypassing the holding unit 48. Accordingly, the voltage detection line 5 connected with the bus bar 2 housed in the housing chamber 33A bypasses the thermistor 4 through the bypassing path 80, the second connection path 72, and the second routing path 42.

As illustrated in FIGS. 5 to 8, the routing path 40 is provided with an electrical line presser 7. The electrical line presser 7 is disposed in each of the first routing path 41, the second routing path 42, and the connection path 43. One electrical line presser 7 is disposed in each of the first connection path 71, the second connection path 72, the third connection path 73, and the fourth connection path 74. A plurality of electrical line pressers 7 are disposed in each of the partial routing paths 51, 52, and 53 of the first routing path 41 and the partial routing paths 61 and 62 of the second routing path 42.

The electrical line presser 7 includes a flexible first pressing part 11 and a flexible second pressing part 12. The first pressing part 11 protrudes from the first side wall 45 toward the second side wall 46. The second pressing part 12 protrudes from the second side wall 46 toward the first side wall 45. The second pressing part 12 faces the first pressing part 11. The first pressing part 11 and the second pressing part 12 are disposed so that, for example, a leading end of the first pressing part 11 and a leading end of the second pressing part 12 face each other. As illustrated in FIG. 7, the shapes of the first pressing part 11 and the second pressing part 12 in plan view are tapered shapes. In other words, the widths of the first pressing part 11 and the second pressing part 12 are smaller toward the leading ends.

As illustrated in FIG. 5, the first pressing part 11 is tilted so that the first pressing part 11 is closer to the bottom wall 44 toward the leading end of the first pressing part 11. The second pressing part 12 is tilted so that the second pressing part 12 is closer to the bottom wall 44 toward the leading end of the second pressing part 12. Accordingly, the first pressing part 11 and the second pressing part 12 are formed to be tilted relative to the bottom wall 44 when no electrical line W is housed in the routing path 40.

As illustrated in FIGS. 7 and 8, the shape of the first pressing part 11 and the shape of the second pressing part 12 are asymmetric to each other in the electrical line presser 7 disposed in the connection path 43. In the electrical line presser 7 in the connection path 43, the first pressing part 11 includes a base part 11a and a tilted part 11b. The shape of the tilted part 11b is same as the shape of the second pressing part 12. In other words, the shape of the tilted part 11b is same as the shape of the first pressing part 11 disposed in the first routing path 41 or the second routing path 42. The tilted part 1b is tilted so that the tilted part 11b is closer to the bottom wall 44 toward a leading end of the tilted part 11b.

The base part 11a is provided on the base end side of the first pressing part 11 and connected with the first side wall 45. The width of the base part 11a is larger than the width of the tilted part 11b. Accordingly, the stiffness of the base part 11a is larger than the stiffness of the tilted part 11b. The base part 11a is parallel to the bottom wall 44. The position of a gap 7a between the first pressing part 11 and the second pressing part 12 is shifted from a center CL of the connection path 43. Since the gap 7a is shifted from the center CL, an electrical line accommodated in the connection path 43 is unlikely to come out of the connection path 43.

When the electrical line W is inserted into the routing path 40, the electrical line W is pressed in by a worker as illustrated in FIG. 9. The electrical line W may be the voltage detection line 5, the temperature detection line 6, or any other line. The worker applies, to the electrical line W, pressing force F1 toward the bottom wall 44. In the electrical line presser 7 of the present embodiment, the first pressing part 11 and the second pressing part 12 are each tilted toward the bottom wall 44. Thus, the electrical line W is automatically guided to the gap 7a. The pressing force F1 deflects and deforms the first pressing part 11 and the second pressing part 12 toward the bottom wall 44. The electrical line W is inserted into the routing path 40 while spreading the gap 7a.

The electrical line presser 7 prevents vibration and movement of the electrical line W by pressing the electrical line W inserted into the routing path 40. In addition, the electrical line presser 7 regulates the electrical line W from coming off out of the routing path 40. In the electrical line presser 7 of the present embodiment, since the first pressing part 11 and the second pressing part 12 are each tilted, the electrical line W is effectively prevented from coming out of the routing path 40. For example, in a case where the electrical line W accommodated inside the routing path 40 presses upward the electrical line presser 7, the gap 7a between the first pressing part 11 and the second pressing part 12 becomes smaller. In this state, the leading end of the first pressing part 11 and the leading end of the second pressing part 12 may contact each other. Since the gap 7a becomes smaller or the first pressing part 11 and the second pressing part 12 contact each other, the electrical line W is unlikely to come out of the routing path 40.

The following describes a routing route in the bus bar-module 1 of the present embodiment. As illustrated in FIG. 2, each thermistor 4 is electrically connected with the temperature detection line 6. Each temperature detection line 6 is routed to bypass the thermistor 4. In the following description, the thermistors 4 disposed in the partial routing paths 52 and 53 of the first routing path 41 are referred to as a "thermistor 4B and" a "thermistor 4C". In addition, the two thermistors 4 disposed in the partial routing path 62 of the second routing path 42 are referred to as a "thermistor 4D" and a "thermistor 4E".

A temperature detection line 6A illustrated in FIG. 10 is connected with a thermistor disposed in the partial routing path 51. The temperature detection line 6A is routed through the partial routing path 51, the first connection path 71, the partial routing path 61, the third connection path 73, and the partial routing path 53. The temperature detection line 6A is extended out of the case 3 through a second end part 53e of the partial routing path 53. Each temperature detection line 6 is connected with, for example, a control device or control circuit that controls the battery pack 100. The temperature detection line 6A bypasses the thermistor 4B, the thermistor 40, the thermistor 4D, and the thermistor 4E routed through the first connection path 71, the partial routing path 61, the third connection path 73, and the partial routing path 53.

As illustrated in FIG. 11, a temperature detection line 6B connected with the thermistor 4B is routed through the partial routing path 52, the second connection path 72, the partial routing path 61, the third connection path 73, and the partial routing path 53. The temperature detection line 6B bypasses the thermistor 4C, the thermistor 4D, and the thermistor 4E routed through the second connection path 72, the partial routing path 61, the third connection path 73, and the partial routing path 53.

As illustrated in FIG. 12, a temperature detection line 60 connected with the thermistor 40 is routed through the partial routing path 53 and extended out of the case 3 through the second end part 53e. A temperature detection line 6D connected with the thermistor 40 is routed through the partial routing path 62, the fourth connection path 74, and the partial routing path 53. The temperature detection line 6D bypasses the thermistor 4E routed through the fourth connection path 74 and the partial routing path 53. A temperature detection line 6E connected with the thermistor 4E is routed through the partial routing path 62, the fourth connection path 74, and the partial routing path 53.

Figure 13:
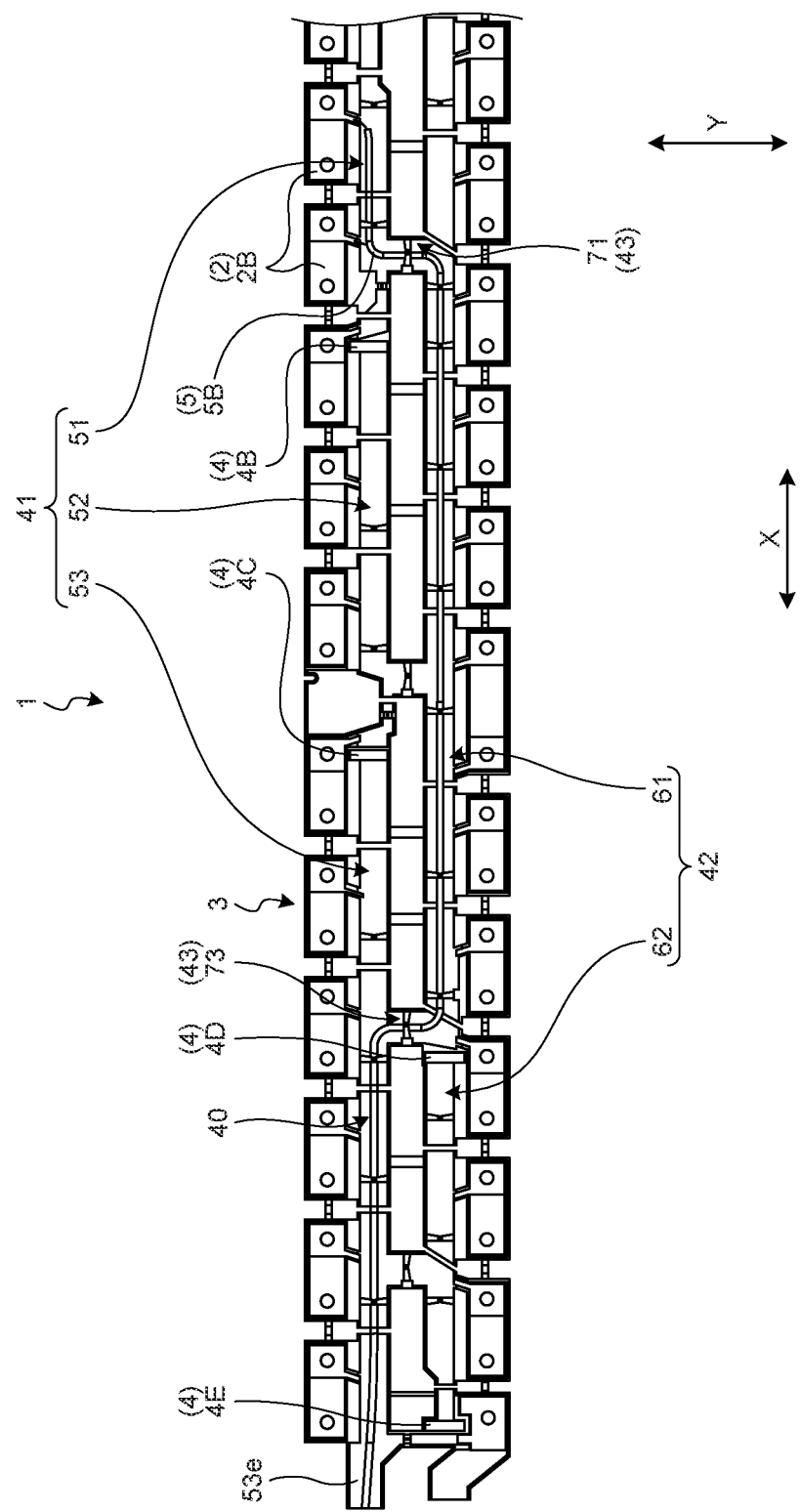
FIG. 13 is a plan view of a routing route of a voltage detection line according to the embodiment.

The following describes a routing route of the voltage detection line 5. The voltage detection line 5 is connected with each bus bar 2. FIG. 13 illustrates a routing route for bus bars 2B disposed along the partial routing path 51. A voltage detection line 5B connected with the bus bars 2B is routed through the partial routing path 51, the first connection path 71, the partial routine path 61, the third connection path 73, and the partial routing path 53. The voltage detection line 5B is routed to meander in a zigzag manner. The voltage detection line 5B bypasses the thermistor 4B, the thermistor 4C, the thermistor 4D, and the thermistor 4E routed through the first connection path 71, the partial routing path 61, and the third connection path 73. The voltage detection line 5 is extended out of the case 3 through the second end part 53e of the partial routing path 53. Each voltage detection line 5 is connected with, for example, a control device or control circuit that controls the battery pack 100.

Figure 14:
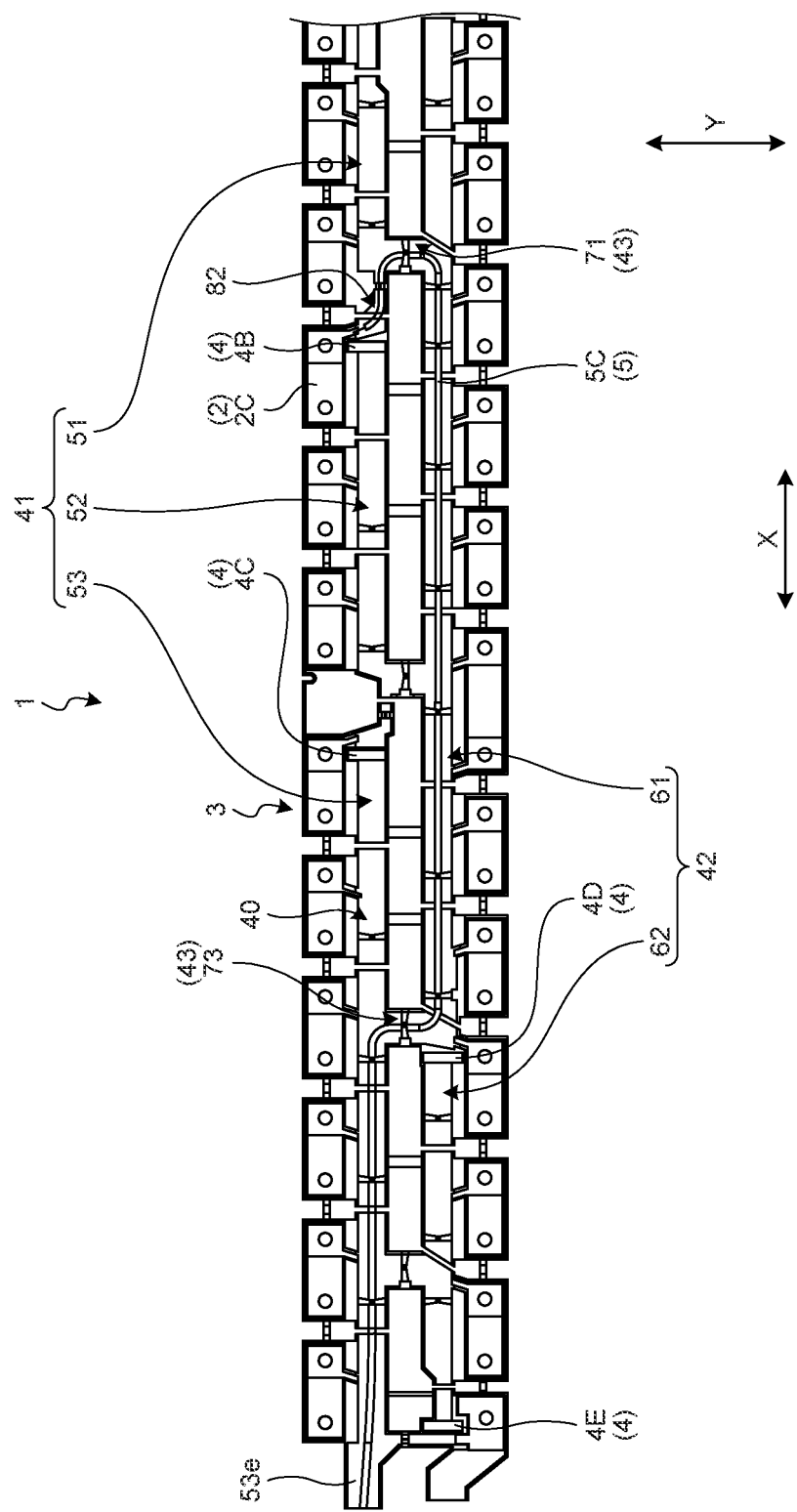
FIG. 14 is a plan view of a routing route of the voltage detection line according to the embodiment.

FIG. 14 illustrates a routing route for a bus bar 2C facing the thermistor 4B in the second direction Y voltage detection line 5C connected with the bus bar 2C is routed through a bypassing path 82, the first connection path 71, the partial routing path 61, the third connection path 73, and the partial routing path 53. The bypassing path 82 is connected with the first connection path 71, bypassing the thermistor 4B. The voltage detection line 5C bypasses the thermistor 4B, the thermistor 4C, the thermistor 4D, and the thermistor 45 through the bypassing path 82, the first connection path 71, the partial routing path 61, the third connection path 73, and the partial routing path 53.

Figure 15:
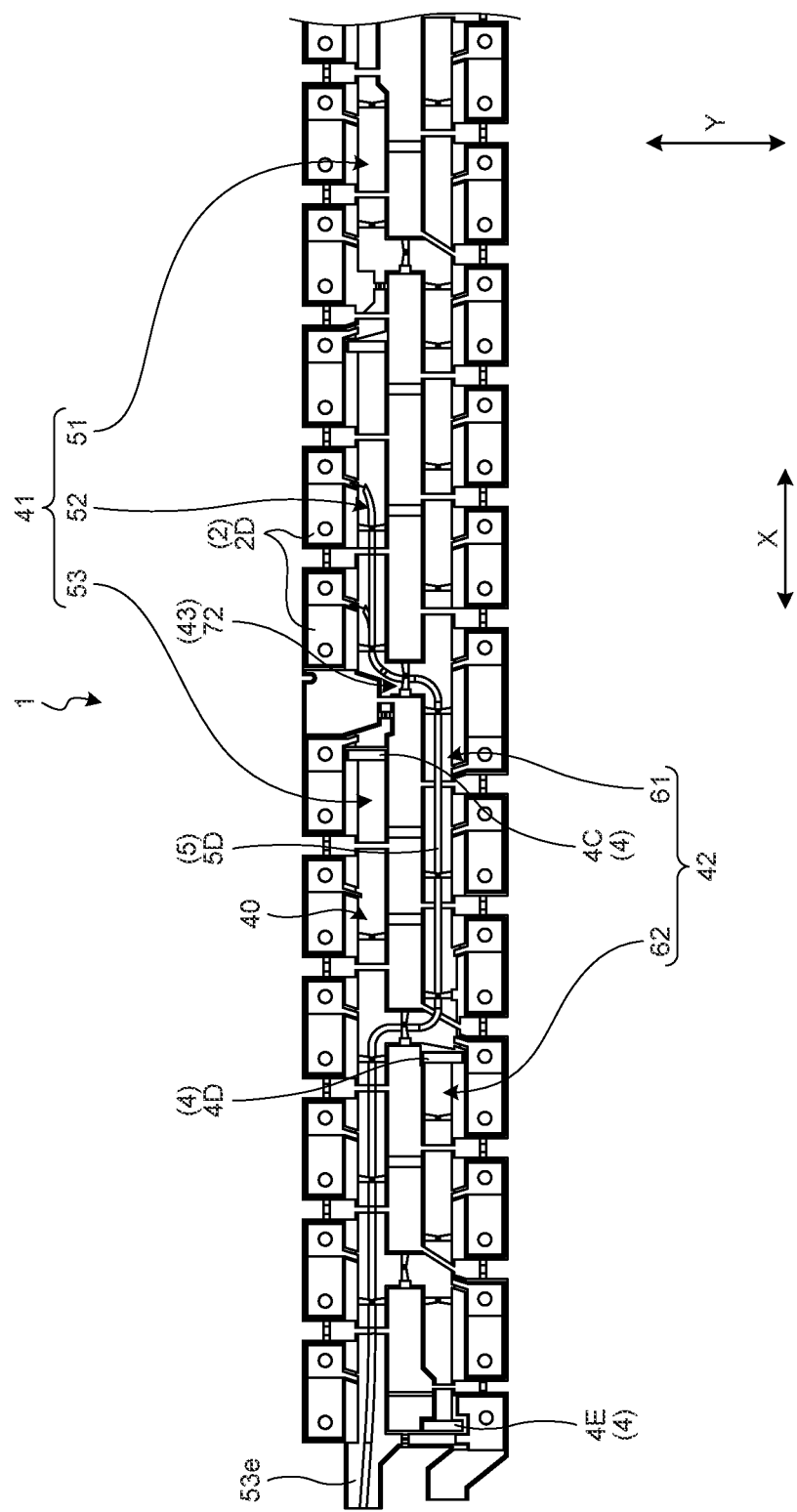
FIG. 15 is a plan view of a routing route of the voltage detection line according to the embodiment.

FIG. 15 illustrates a routing route for bus bars 2D disposed along the partial routing path 52. A voltage detection line 5D connected with the bus bars 2D is routed through the partial routing path 52, the second connection path 72, the partial routing path 61, the third connection path 73, and the partial routing path 53. The voltage detection line 5D bypasses the thermistor 4C, the thermistor 4D, and the thermistor 45 through the second connection path 72, the partial routing path 61, the third connection path 73, and the partial routing path 53.

Figure 16:
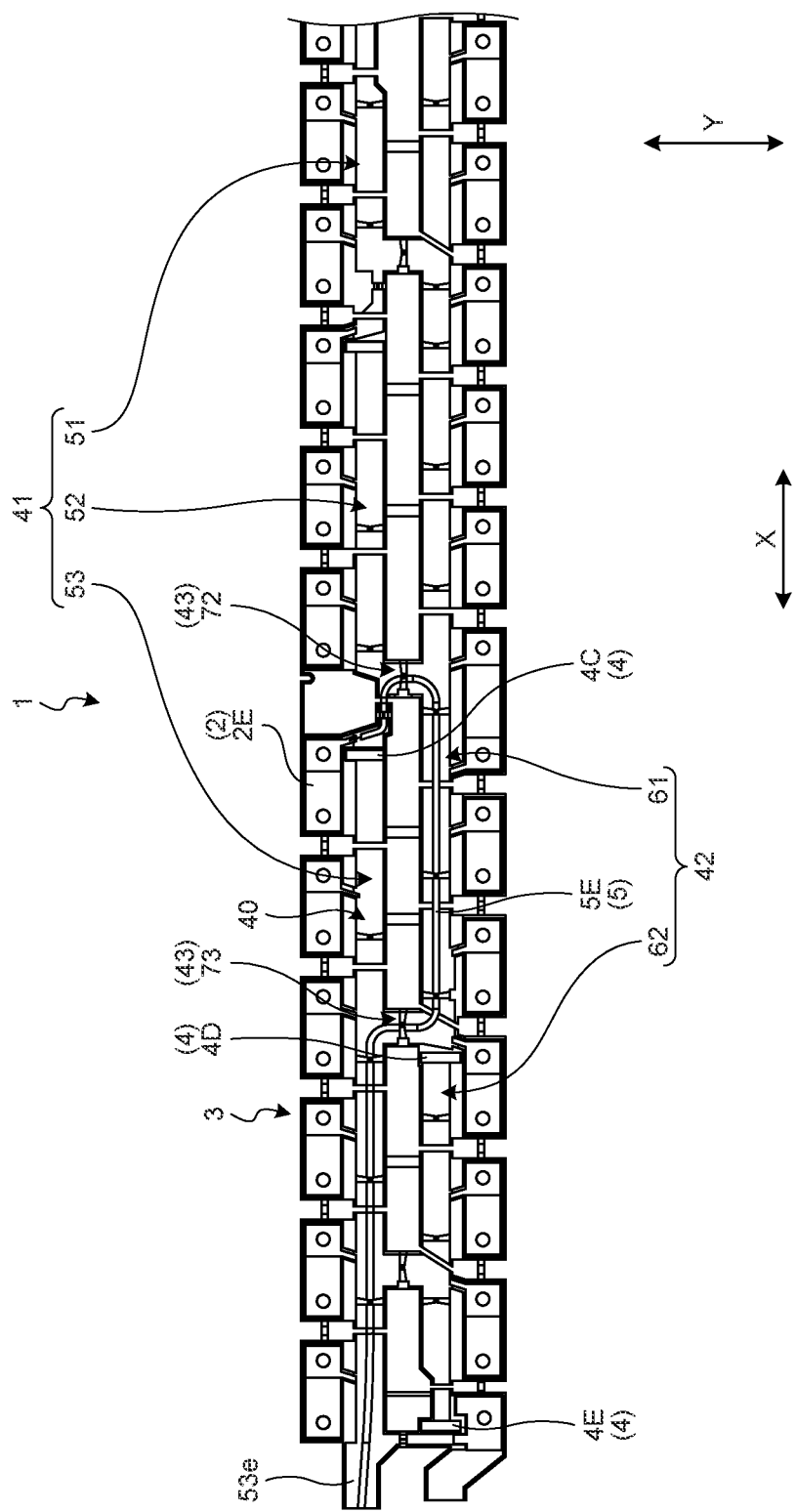
FIG. 16 is a plan view of a routing route of the voltage detection line according to the embodiment.

FIG. 16 illustrates a routing route for a bus bar 25 facing the thermistor 4C in the second direction Y. A voltage detection line 5 connected with the bus bar 2E is routed through the bypassing path 80, the second connection path 72, the partial routing path 61, the third connection path 73, and the partial routing path 53. The voltage detection line 5E bypasses the thermistor 4C, the thermistor 4D, and the thermistor 4E through the bypassing path 80, the second connection path 72, the partial routing path 61, the third connection path 73, and the partial routing path 53.

Figure 17:
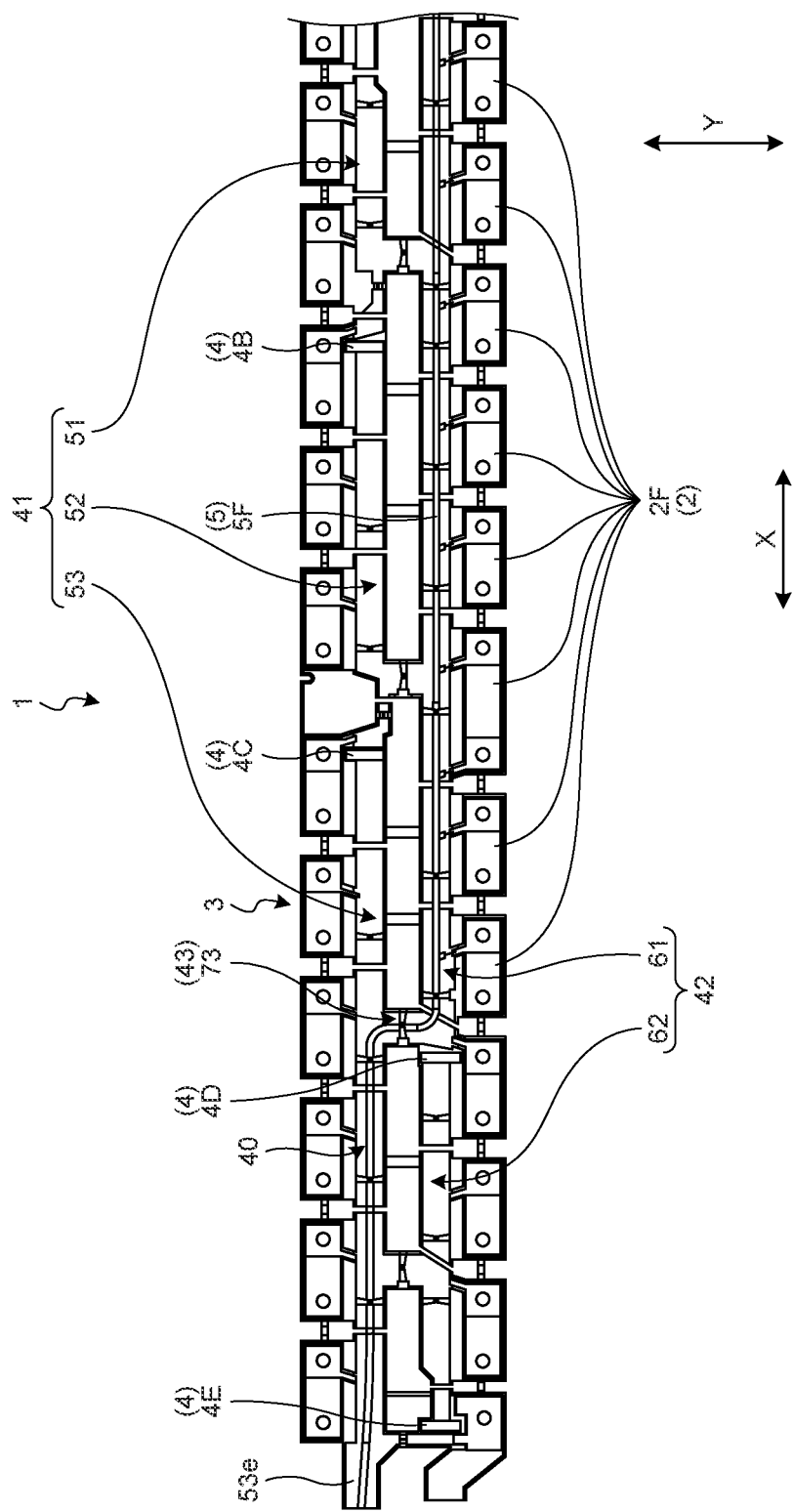
FIG. 17 is a plan view of a routing route of the voltage detection line according to the embodiment.

FIG. 17 illustrates a routing route for bus bars 2F disposed along the partial routing path 61. A voltage detection line 5F connected with the bus bars 2F is routed through the partial routing path 61, the third connection path 73, and the partial routing path 53. The voltage detection line 5F bypasses the thermistor 4D and the thermistor 4E through the third connection path 73 and the partial routing path 53.

FIG. 18 illustrates a routing route for a bus bar 2G facing the thermistor 4D in the second direction Y. The terminal part 23 of the bus bar 2G protrudes toward the third connection path 73. Accordingly, the terminal part 23 of the bus bar 2G protrudes toward the outside of the partial routing path 62. A voltage detection line 5G connected with the bus bar 2G is routed bypassing the thermistor 4D and the thermistor 4E through the third connection path 73 and the partial routing path 53.

FIG. 19 illustrates a routing route for bus bars 2H disposed along the partial routing path 62. A voltage detection line 5H connected with the bus bars 2H is routed through the partial routing path 62, the fourth connection path 74, and the partial routing path 53. The voltage detection line 5H bypasses the thermistor 4D and the thermistor 4E through the fourth connection path 74 and the partial routing path 53.

In this manner, all voltage detection lines 5 are routed bypassing the thermistors 4 in the bus bar module 1 of the present embodiment. Accordingly, the voltage detection lines 5 do not overlap nor contact the thermistors 4. When a voltage detection line 5 is routed overlapping a thermistor 4, interference occurs between the voltage detection line 5 and the thermistor 4 in some cases. This potentially causes deformation or breaking of a lead frame of the thermistor 4. In addition, the thermistor 4 potentially damages the voltage detection line 5. In the bus bar module 1 of the present embodiment, the occurrences of these problems are reduced since the voltage detection lines 5 are routed bypassing the thermistors 4.

In the bus bar module 1 of the present embodiment, the voltage detection line 5 and the temperature detection line 6 are routed through the routing path 40 in common. Accordingly, the size of an electrical line housing part in the case 3 is reduced. In addition, it is not needed to separately prepare a protector of the voltage detection line 5 and a protector of the temperature detection line 6, which leads to reduction of the component numbers.

As illustrated in FIG. 20, the bus bar module 1 includes a cover 9 that covers the case 3. The cover 9 is formed of insulating synthesis resin or the like. The cover 9 includes a first cover part 91 that covers the first routing path 41, a second cover part 92 that covers the second routing path 42, and a third cover part 93 that covers the connection path 43. The first cover part 91, the second cover part 92, and the third cover part 93 are integrally molded. The first cover part 91 blocks an opening part of the first routing path 41 to prevent the electrical line W from protruding out of the first routing path 41. The second cover part 92 blocks an opening part of the second routing path 42 to prevent the electrical line W from protruding out of the second routing path 42. The third cover part 93 blocks an opening part of the connection path 43 to prevent the electrical line W from protruding out of the connection path 43.

The cover 9 includes a plurality of engagement parts that are engaged with the case 3. The engagement parts include an engagement part 93a illustrated in FIG. 20. The engagement part 93a is provided to the third cover part 93. The case 3 includes an engagement part 35 corresponding to the engagement part 93a. The engagement part 35 is provided to the connection path 43. Since the engagement parts 35 and 93a are provided, the electrical line W is effectively prevented from protruding out of the connection path 43.

As described above, the bus bar module 1 of the present embodiment includes the bus bars 2 and the insulating case 3. The bus bars 2 are conductive members electrically connected with the battery cells 120 included in the battery module 110. The case 3 includes the housing unit 30 configured to accommodate the bus bars 2 and the routing path 40 in which the voltage detection line 5 connected with the bus bar 2 is routed. The bus bars 2 include the first bus bar group 21 and the second bus bar group 22. The first bus bar group 21 are arrayed in the direction in which the battery cells 120 are arranged. The second bus bar group 22 is parallel to the first bus bar group 21 and arrayed in the direction in which the battery cells 120 are arranged.

The routing path 40 includes the first routing path 41, the second routing path 42, and at least one connection path 43. The first routing path 41 extends along the first bus bar group 21 in the direction in which the battery cells 120 are arranged. The second routing path 42 extends along the second bus bar group 22 in the direction in which the battery cells 120 are arranged. The connection path 43 connects the first routing path 41 and the second routing path 42. In the bus bar module 1 of the present embodiment, the electrical line W can be routed through the connection path 43 from the first routing path 41 to the second routing path 42 or from the second routing path 42 to the first routing path 41. This improves the flexibility of routing the electrical line W in the routing path 40.

In the bus bar module 1 of the present embodiment, a routing route can be set to avoid excess concentration of the electrical line W to the first routing path 41 and the second routing path 42. Conversely, it is also possible to allow concentration of the electrical line W to one of the first routing path 41 and the second routing path 42. For example, the electrical line W may be routed in concentration to the first routing path 41 or the second routing path 42 in an interval from one connection path 43 to another connection path 43. Exits for the electrical line W may be dispersively provided to the first routing path 41 and the second routing path 42. For example, in the bus bar module 1 of the present embodiment, all electrical lines W are extended out of the case 3 through the second end part 53e of the partial routing path 53. Instead, the electrical lines W may be extended out of the case 3 through the partial routing path 53 and the partial routing path 62.

Moreover, the connection path 43 of the present embodiment improves the stiffness and strength of the case 3. Since the first routing path 41 and the second routing path 42 are connected by the connection path 43, the stiffness and strength of the case 3 are improved.

The connection path 43 of the present embodiment extends in a direction orthogonal to the direction in which the battery cells 120 are arranged. Thus, it is possible to minimize the length of the connection path 43.

The first routing path 41 of the present embodiment is partitioned into the partial routing paths 51, 52, and 53 arranged in the direction in which the battery cells 120 are arranged. The partial routing paths 51, 52, and 53 of the first routing path 41 are each connected with the second routing path 42 through the connection path 43. For example, all partial routing paths 51, 52, and 53 are preferably connected with the second routing path 42 through at least one connection path 43.

The second routing path 42 of the present embodiment is partitioned into the partial routing paths 61 and 62 arranged in the direction in which the battery cells 120 are arranged. The partial routing paths 61 and 62 of the second routing path 42 are each connected with the first routing path 41 through the connection path 43. For example, all partial routing paths 61 and 62 are preferably connected with the first routing path 41 through at least one connection path 43.

The bus bar module 1 of the present embodiment includes a thermistor 4 configured to detect the temperature of the battery cell 120. The thermistor 4 is held at the first end part 52a or 53a as one end part of each of the partial routing paths 52 and 53. The connection path 43 is connected with the partial routing paths 52 and 53 at positions different from the first end parts 52a and 53a. Accordingly, the voltage detection line 5 can be easily routed without interference between the voltage detection line 5 and the thermistor 4.

As an example of the connection form as described above, the connection path 43 of the present embodiment is connected with the second end part 52b as an end part opposite to the first end part 52a of the partial routing path 52. Accordingly, the direction of routing the voltage detection line 5 is fixed, which improves the efficiency of routing work.

The first end parts 52a and 53a of the present embodiment are each provided with the partition wall 49 that partitions the thermistor 4 from the corresponding one of the partial routing paths 51 and 52 adjacent thereto. The existence of the partition wall 49 allows the worker to easily recognize a routing route of the voltage detection line 5. Moreover, mistake of routing the voltage detection line 5 over the thermistor 4 is unlikely to occur.

The voltage detection line 5 of the present embodiment is routed bypassing the thermistors 4 through the connection path 43 to avoid overlapping the thermistors 4. Thus, an excessive load is unlikely to be applied on the thermistors 4 and the voltage detection line 5. A sufficient housing capacity is obtained at part of the routing path 40 in some cases by bypassing the voltage detection line 5. A bonder or the like that connects a plurality of electrical lines W may be disposed at a part where the housing capacity is low.

The electrical line presser 7 is provided to the connection path 43 of the present embodiment. The electrical line presser 7 includes the first pressing part 11 protruding from the first side wall 45 toward the second side wall 46, and the second pressing part 12 protruding from the second side wall 46 toward the first side wall 45. The first pressing part 11 and the second pressing part 12 face each other. The first pressing part 11 is tilted so that the first pressing part 11 is closer to the bottom wall 44 toward the leading end of the first pressing part 11. The second pressing part 12 is tilted so that the second pressing part 12 is closer to the bottom wall 44 toward the leading end of the second pressing part 12. The electrical line presser 7 prevents the electrical line W from protruding out of the connection path 43.

When the electrical line W is routed through the connection path 43, the electrical line W bends at an intersection of the first routing path 41 and the connection path 43 and at an intersection of the second routing path 42 and the connection path 43. Thus, the electrical line W is likely to be uplifted in the connection path 43 by reaction force of the electrical line W. In the present embodiment, since the electrical line presser 7 is provided to the connection path 43, the uplift of the electrical line W is appropriately prevented.

Modifications of Embodiment

The following describes modifications of the embodiment. The shape of the connection path 43, the number of connection paths 43, and disposition thereof are not limited to exemplarily described shape, number, and disposition. The number and disposition of thermistors 4 disposed in the case 3 are not limited to exemplarily described number and disposition. The electrical lines W routed through the routing path 40 may include an electrical line different from any of the voltage detection line 5 and the temperature detection line 6. The shape of each battery cell 120, the number of battery cells 120, and disposition thereof are not limited to exemplarily described shape, number, and disposition.

Contents disclosed in the above-described embodiment and modifications may be executed in combination as appropriate.

Routing paths of a bus bar module according to the embodiment include a first routing path extending along a first bus bar group in a direction in which battery cells are arranged, a second routing path extending along a second bus bar group in the direction in which the battery cells are arranged, and at least one connection path connecting the first routing path and the second routing path. In the bus bar module according to the embodiment, a voltage detection line can be routed through the connection path from the first routing path to the second routing path or from the second routing path to the first routing path. Thus, the flexibility of a routing route can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bus bar module comprising:
a plurality of bus bars electrically connected with a plurality of battery cells included in a battery module;
an insulating case including a housing unit configured to accommodate the bus bars and a routing path in which a voltage detection line connected with the bus bar is routed; and
a thermistor configured to detect temperature of the battery cell, wherein
the bus bars include a first bus bar group arrayed in a direction in which the battery cells are arranged, and a second bus bar group parallel to the first bus bar group and arrayed in the direction in which the battery cells are arranged,
the routing path includes a first routing path extending along the first bus bar group in the direction in which the battery cells are arranged, a second routing path extending along the second bus bar group in the direction in which the battery cells are arranged, and at least one connection path connecting the first routing path and the second routing path,
the first routing path is partitioned into a plurality of partial routing paths arranged in the direction in which the battery cells are arranged,
each of the partial routing paths of the first routing path is connected with the second routing path through the connection path,
one of the partial routing paths includes a first end part that is one end part of the partial routing path in the direction in which the battery cells are arranged,
the thermistor is held at the first end part,
the connection path is connected with the partial routing path at a position different from the first end part in the direction in which the battery cells are arranged, and
the voltage detection line is routed bypassing the thermistor through the connection path to avoid overlapping the thermistor.

2. The bus bar module according to claim 1, wherein the connection path extends in a direction orthogonal to the direction in which the battery cells are arranged.

3. The bus bar module according to claim 1, wherein
the second routing path is partitioned into a plurality of partial routing paths arranged in the direction in which the battery cells are arranged, and
each of the partial routing paths of the second routing path is connected with the first routing path through the connection path.

4. The bus bar module according to claim 2, wherein
the second routing path is partitioned into a plurality of partial routing paths arranged in the direction in which the battery cells are arranged, and
each of the partial routing paths of the second routing path is connected with the first routing path through the connection path.

5. The bus bar module according to claim 1, wherein the connection path is connected with a second end part as an end part of the partial routing path opposite to the first end part.

6. The bus bar module according to claim 1, wherein the first end part is provided with a partition wall that partitions the thermistor from another adjacent partial routing path.

7. The bus bar module according to claim 5, wherein the first end part is provided with a partition wall that partitions the thermistor from another adjacent partial routing path.

8. The bus bar module according to claim 1, wherein the routing path includes a bottom wall facing the battery cells, a first side wall erected from one end of the bottom wall in a width direction, and a second side wall erected from the other end of the bottom wall in the width direction, the connection path is provided with an electrical line presser including a first pressing part and a second pressing part, the first pressing part protruding from the first side wall toward the second side wall, the second pressing part protruding from the second side wall toward the first side wall and facing the first pressing part, the first pressing part is tilted so that the first pressing part is closer to the bottom wall toward a leading end of the first pressing part, and the second pressing part is tilted so that the second pressing part is closer to the bottom wall toward a leading end of the second pressing part.

* * * * *